United States Patent [19]

Matsuura et al.

[11] Patent Number: 5,608,013
[45] Date of Patent: Mar. 4, 1997

[54] POLYIMIDES AND THERMOSETTING RESIN COMPOSITIONS CONTAINING THE SAME

[75] Inventors: Hidekazu Matsuura, Oyama; Yasuo Miyadera, Tsukuba, both of Japan

[73] Assignee: Hitachi Chemical Company, Ltd., Tokyo, Japan

[21] Appl. No.: 399,515

[22] Filed: Mar. 7, 1995

Related U.S. Application Data

[63] Continuation of Ser. No. 697,021, May 8, 1991, abandoned.

[30] Foreign Application Priority Data

| May 10, 1990 | [JP] | Japan | 2-120981 |
| May 10, 1990 | [JP] | Japan | 2-120982 |

[51] Int. Cl.$^6$ .......... C08G 73/10; C08G 18/30; C08L 79/08
[52] U.S. Cl. .......... 525/422; 522/138; 522/149; 522/164; 522/166; 522/167; 522/173; 525/421; 525/426; 525/452; 528/70; 528/73; 528/211; 528/353
[58] Field of Search .......... 528/70, 73, 211, 528/353; 525/421, 422, 426, 452; 522/138, 149, 164, 166, 167, 173

[56] References Cited

U.S. PATENT DOCUMENTS

| 3,407,176 | 10/1968 | Loncrini | 528/353 |
| 3,435,002 | 3/1969 | Holub | 528/353 |
| 4,512,893 | 4/1985 | Makino et al. | 528/229 |
| 4,629,777 | 12/1986 | Pfeifer | 528/353 |
| 4,698,295 | 10/1987 | Pfeifer et al. | 430/270 |
| 4,720,539 | 1/1988 | Rabilloud et al. | 528/353 |
| 4,760,126 | 7/1988 | Numata et al. | 528/353 |
| 4,837,300 | 6/1989 | St. Clair et al. | 528/125 |
| 4,914,182 | 4/1990 | Pfeifer et al. | 528/125 |
| 4,946,908 | 8/1990 | Chu et al. | 525/426 |
| 4,946,935 | 8/1990 | Ohsaka et al. | 528/353 |
| 4,965,337 | 10/1990 | Peters et al. | 528/353 |
| 4,985,509 | 1/1991 | Matuura et al. | 525/426 |
| 4,987,197 | 1/1991 | Ohta et al. | 528/353 |
| 4,987,207 | 1/1991 | Yamaya et al. | 525/426 |
| 4,994,544 | 2/1991 | Nagahiro et al. | 528/353 |
| 5,037,689 | 8/1991 | Boyd | 525/426 |

FOREIGN PATENT DOCUMENTS

| 3113988 | 2/1982 | Germany . |
| 62-232475 | 10/1987 | Japan . |

OTHER PUBLICATIONS

*Beilsteins Handbuch Der Organischen Chemie;* Fourth Edition; Verlag von Julius Springer; Berlin; 1930; p. 265.

Primary Examiner—James J. Seidleck
Assistant Examiner—Rabon Sergent
Attorney, Agent, or Firm—Antonelli, Terry, Stout & Kraus, LLP

[57] ABSTRACT

A polyimide obtained by reacting an acid dianhydride such as catechol bistrimellitate dianhydride, bisphenol A bistrimellitate dianhydride, etc. with a diamine such as 4,4'-diamino-3,3',5,5'-tetraisopropyl-diphenylmethane, etc. has high solubility in organic solvents and good moldability at low temperatures, and can provide a thermosetting resin composition together with a polymaleimide.

7 Claims, 8 Drawing Sheets

POLYIMIDES AND THERMOSETTING RESIN COMPOSITIONS CONTAINING THE SAME

This applicatiion is a Continuation application of application Ser. No. 697,021, filed May 8, 1991, now abandoned.

BACKGROUND OF THE INVENTION

This invention relates to novel polyimides having high solubility in organic solvents and excellent low-temperature moldability, a process for preparing such polyimides, and thermosetting resin compositions containing said polyimides, showing excellent properties even after low-temperature curing and useful as an adhesive, laminating material, molding material and the like.

Polyimide resins have excellent heat resistance, but many of them are poor in moldability because of insufficient solubility and fusibility. Therefore, for molding a film or other products from a polyimide, it has been necessary to perform molding by using a varnish prepared by dissolving a polyamide acid, which is a precursor of polyimide, in an organic solvent, and then conduct an imidation treatment on the molded product. However, a varnish comprising a polyamide acid is lowered in molecular weight when hydrolyzed, so that it must be kept at a low temperature. The above-said prior art molding process also had problems such as precipitation of the resin due to moisture absorption since the solvents usually used in said process are hydroscopic, formation and retention of voids in the molded product due to generation of an aqueous condensate in the course of imidation after molding of a desired product such as film, and unapplicability to a base material with poor heat resistance since use of a high temperature above 300° C. is required for the imidation treatment.

Various polyimides having a softening point and therefore capable of molding have been developed and proposed for solving said prior art problems.

For instance, Japanese Patent Unexamined Publication No. 62-10051 discloses a polyimide composed of a diamine and pyromellitic acid, which is represented by the formula:

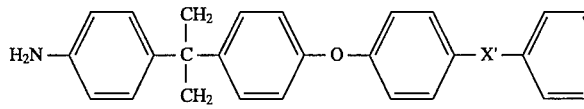 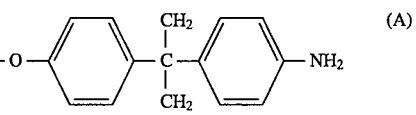
(A)

wherein X' stands for C=O or SO$_2$. This polyimide has a softening point and is capable of molding, but because of its too high softening point, molding must be carried out at a temperature over 300° C. Also, this polyimide is scarcely or only slightly soluble in organic solvents, so that for molding a thin film therefrom, it is necessary to first form a film by using a varnish prepared by dissolving a polyamide acid, which is a precursor of said polyimide, in an organic solvent and then imidize the film compound by heating at a high temperature. Thus, this polyimide still involves the problems such as mentioned above.

The polyimides soluble in organic solvents have also been developed for overcoming said problems. For example, the polyimides composed of 4,4'-methylenebis(2,6-dialkylanyline) and acid dianhydrides such as biphenyltetracarboxylic acid dianhydride, pyromellitic acid dianhydride, etc., disclosed in U.S. Pat. No. 4,851,505 (Japanese Patent Unexamined Publication No. 1-263116) and U.S. Pat. No. 4,935,490 (Japanese Patent Unexamined Publication No. 1-263117) are soluble in N-methylpyrrolidone and m-cresol.

These polyimides, however, have as high a glass transition point as over 400° C. and require a high temperature for molding.

Also, Japanese Patent Examined Publication No. 43-19814 (German Offenlegungsschrift No. 1,520,012) discloses polyimides obtained from paraphenylene-bis(trimellitate) dianhydrides and diamines such as benzidine, 4,4'-diaminodiphenyl ether, etc., and Japanese Patent Examined Publication No. 43-5911 teaches that bisphenol A bistrimellitate dianhydrides can be used as a starting material for the preparation of polyimides (no example of preparation of polyimide by using said substance is shown). Any of the polyimides disclosed or mentioned in these patent publications is higher than 350° C. in softening point, and no teaching is made on their solubility in the organic solvents with small polarity.

U.S. Pat. No. 4,681,928 (Japanese Patent Unexamined Publication No. 60-258225) discloses the polyimides obtainable by reacting 1,4-bis(p-aminocumyl)benzene and a dianhydride of an aromatic or aliphatic acid, and it is verified that such polyimides are soluble in N-methylpyrrolidone. It is also taught that these polyimides are fusible (the glass transition point being around 200° C.). 2,2-bis[4,4-(3,4-dicarboxyphenoxy)phenyl]propane, etc., are mentioned as examples of said acid dianhydride. Paraphenylene-bis(trimellitate)dianhydride is also referred to as an example of said acid dianhydride, but there is shown no example of preparation of polyimide by using said compound. These polyimides are insoluble in toluene and ethylene glycol dimethyl ether which are smaller in polarity than N-methylpyrrolidone. No mentioned is made of the solubility of said polyimides in the organic solvents with small polarity, such as dioxane, tetrahydrofuran and methylene chloride.

Further, Japanese Patent Unexamined Publication No. 2-11633 discloses a process for preparing a polyimide by reacting a diamine having 6-member rings in the main chain, such as the diamine of the afore-shown formula A, with a specific acid dianhydride (e.g. bisphenol A bistrimellitate dianhydride). The polyimides prepared according to this process are low in softening point and also improved in solubility in organic solvents in comparison with the polyimides disclosed in Japanese Patent Unexamined Publication No. 62-10051. Regarding solubility in organic solvents, the polyimides obtained according to the process disclosed in Japanese Patent Unexamined Publication No. 2-11633 are soluble in N,N-dimethylformamide, dioxane, etc., but insoluble in toluene and diethylene glycol dimethyl ether. Also, said diamines are not only difficult to produce with high purity but also expensive, so that their industrial use is disadvantageous in terms of economy.

As noted from the foregoing, it has been very difficult to produce the polyimides which are low in softening point and have sufficiently high solubility in organic solvents.

On the other hand, the resin compositions prepared by adding polymaleimides to polyamide acids or polyimides have a wide scope of use as the cured products of said resin compositions are tough and high in heat resistance. Said resin compositions are used, for instance, for the preparation of adhesives, varnish for printed wiring boards, and prepregs. Prepregs can be used for producing the printed wiring boards, etc.

U.S. Pat. No. 4,362,826 discloses a thermosetting resin composition comprising a polyamide acid obtained from 4,4'-diaminodiphenyl ether and pyromellitic acid dianhydride and a bismaleimide compound. It is shown that this composition can be worked into a cured film (film supported on a substrate) by cast coating said composition onto a substrate such as a copper foil and drying the coat with heating.

However, the resin compositions prepared by adding bismaleimides to polyamide acids such as mentioned above are required, when cured, to not only react a polymaleimide but also imidate the polyamide acid. This necessitates heating at a temperature above 300° C. for curing, so that these compositions can not be applied to a base material with low heat resistance. Also, since an aqueous condensate is generated concomitant with imidation of the polyamide acid, formation of the voids is unnegligible although it is suppressed to some extent by the presence of polymaleimide. Especially, when said composition is interposed between a Kapton film (polyimide film) and a metal foil such as copper foil and cured for bonding them, formation of the voids causes an excessive reduction of adhesive force.

It is well known in the art that the polyimides obtained by imidating the amide acids such as disclosed in U.S. Pat. No. 4,362,826 are insoluble in organic solvents and also infusible. Further, no example of polyimides soluble in organic solvents is shown in this U.S. patent.

Regarding the compositions containing a polyimide and a polymaleimide, U.S. Pat. No. 3,842,143 discloses a composition prepared by adding a polymaleimide to an amino-terminated low-molecular weight polyimide obtained by reacting a tetracarboxylic acid dianhydride with an excess of a diamine. However, in case of using such a low-molecular weight polyimide, the film obtained from said composition lacks flexibility, and no self-supporting film can be obtained. In this U.S. patent, no mention is made of a composition having enough flexibility to form a self-supporting film nor is shown any polyimide to be used for such a composition.

U.S. Pat. No. 4,985,509 (Japanese Patent Application Unexamined Publication No. 62-30112) discloses a composition containing a polyimide obtained from 3,3',4,4'-benzophenonetetracarboxylic acid dianhydride, bis[4-(3-aminophenoxy)phenyl]sulfone and if necessary 2,4-diaminotoluene and a polymaleimide and states that this composition has good film-forming properties and the film made therefrom shows excellent adhesiveness. It is also taught that said polyimide is soluble in a toluene/m-cresol mixed solvent. However, the polyimide disclosed in this U.S. patent is insoluble in the organic solvents with small polarity such as tetrahydrofuran, dioxane and methylene chloride. Also, the composition disclosed therein is fusible and cured at a relatively low temperature (250°–275° C.) and shows excellent adhesiveness, but this composition is deteriorated in its properties when cured at a temperature lower than 230° C.

In the afore-mentioned Japanese Patent Unexamined Publication No. 62-10051, U.S. Pat. Nos. 4,851,505, 4,935,490, Japanese Patent Examined Publication No. 43-18914 (DE-OS 1,520,012), Japanese Patent Examined Publication No. 43-5911, U.S. Pat. No. 4,681,928 and Japanese Patent Unexamined Publication No. 2-11633, no disclosure is made of the compositions containing a polyimide and a polymaleimide.

As understood form the above, there is yet known no composition which contains a polyimide and a polymaleimide and which shows the excellent characteristics when cured at a satisfactorily low temperature and also has good film-forming properties. Nor is known a polyimide suited for use as a component of such a composition.

SUMMARY OF THE INVENTION

The present invention is envisioned to provide the novel polyimides having high solubility in organic solvents and a low softening point, and a process for preparing such polyimides.

It is also envisaged in this invention to provide the resin compositions containing a polyimide and a polymaleimide, which compositions, owing to use of the novel and useful polyimides, show the excellent properties even when cured at a low temperature.

According to the present invention, there are provided a polyimide comprising repeating units represented by the formula:

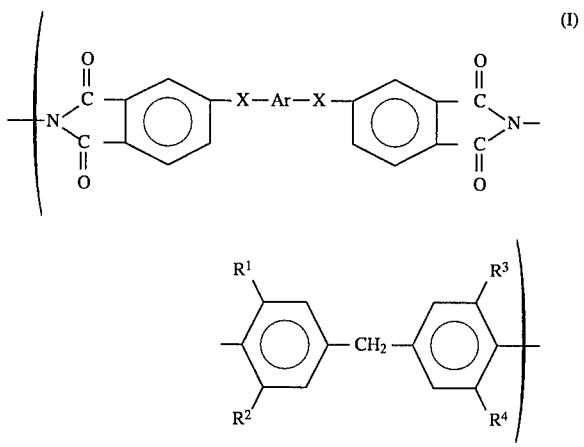

wherein Ar is a divalent group containing an aromatic ring; X is

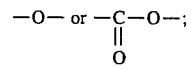

and $R^1$, $R^2$, $R^3$ and $R^4$ represent independently an alkyl or alkoxyl group having 1 to 4 carbon atoms.

The present invention-also provides a polyimide comprising 10 to 90 mol % of the repeating units (I) and 90 to 10 mol % of repeating units represented by the formula:

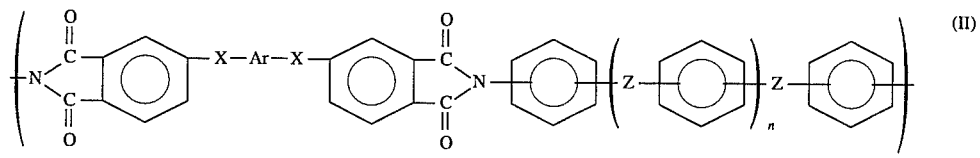

wherein Z is $$\!>\!\!C\!=\!O, \;\; \!>\!\!SO_2, \;\; -O-, \;\; -S-, \;\; -(CH_2)_{\overline{m}}, \;\; -CO-NH-,$$

$$-\underset{\underset{CH_3}{|}}{\overset{\overset{CH_3}{|}}{C}}-, \;\; -\underset{\underset{CF_3}{|}}{\overset{\overset{CF_3}{|}}{C}}-, \;\; -\overset{\overset{O}{\|}}{C}-O-$$

or a direct linkage, and a plurality of Z's may be the same or different; m is an integer of 1 or more; n is an integer of 1 to 4; and hydrogen in each benzene ring may be substituted with a substituent.

There is also provided according to this invention a process for preparing a polyimide, which comprises reacting an acid dianhydride represented by the formula:

$$\text{(III)}$$

wherein Ar is a divalent group containing an aromatic ring; and X is $$-O- \text{ or } -\overset{\overset{O}{\|}}{C}-O-,$$

with a compound represented by the formula:

$$\text{(IV)}$$

wherein Y is an amino group or an isocyanate group; and $R^1$, $R^2$, $R^3$ and $R^4$ represent independently an alkyl or akoxyl group having 1 to 4 carbon atoms.

The present invention also provides a process for preparing a polyimide characterized in that as reaction counterpart of the acid dianhydride of the formula (III) in the above-described polyimide preparation process, there are used 10 to 90 mol % of a compound of the formula (IV) and 90 to 10 mol % of a compound represented by the formula:

$$\text{(V)}$$

wherein Z is $$\!>\!\!C\!=\!O, \;\; \!>\!\!SO_2, \;\; -O-, \;\; -S-, \;\; -(CH_2)_{\overline{m}}, \;\; -CO-NH-,$$

$$-\underset{\underset{CH_3}{|}}{\overset{\overset{CH_3}{|}}{C}}-, \;\; -\underset{\underset{CF_3}{|}}{\overset{\overset{CF_3}{|}}{C}}-, \;\; -\overset{\overset{O}{\|}}{C}-O-$$

or a direct linkage, and a plurality of Z's may be the same or different; Y is an amino group or an isocyanate group; m is an integer of 1 or more; n is an integer of 1 to 4; and hydrogen in each benzene ring may be substituted with a substituent.

The present invention further provides a thermosetting resin composition comprising (A) a polyimide having the repeating units of the formula (I) and (B) a polymaleimide represented by the formula:

$$\left( \begin{array}{c} CH-CO \\ \| \\ CH-CO \end{array} \!\!\!>\!\!\! N \!\!\right)_{\!\!\overline{m}}\!\!-R \quad \text{(VI)}$$

wherein R is a group with an integral number of valency having 2 or more carbon atoms; and m is an integer or 2 or greater.

There are also provided according to this invention a thermosetting resin composition comprising (A') a polyimide having the repeating units of the formulae (I) and (II) and (B) a polymaleimide of the formula (VI).

DESCRIPTION OF THE PREFERRED EMBODIMENTS

Figure 1:
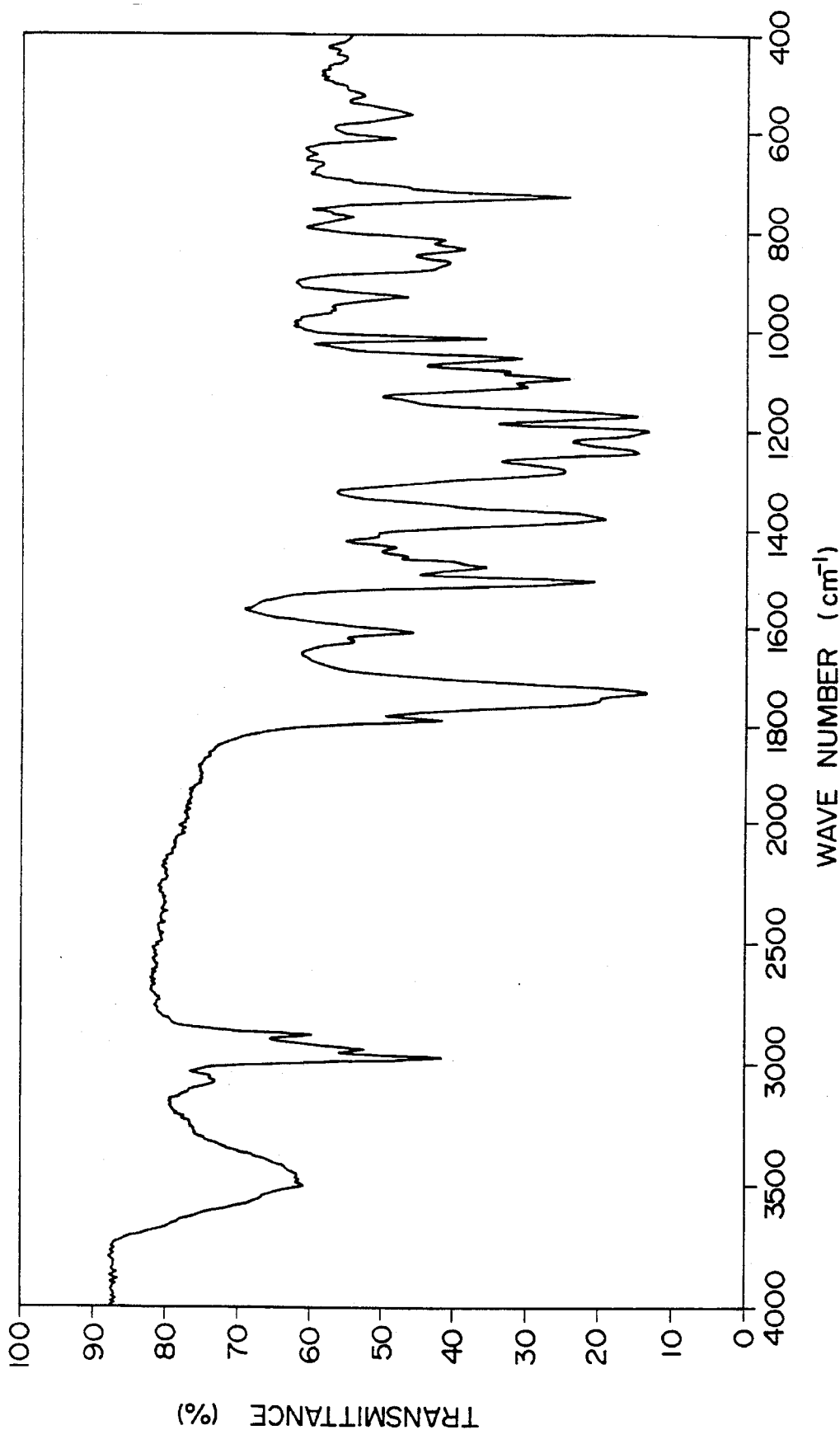
FIG. 1 is an IR absorption spectrum of the polyimide obtained in Example 1.

The polyimide of the present invention comprises repeating units represented by the formula:

$$\text{(I)}$$

wherein Ar is a divalent group containing an aromatic ring; X is $$-O- \text{ or } -\overset{\overset{O}{\|}}{C}-O-;$$

and $R^1$, $R^2$, $R^3$ and $R^4$ represent independently an alkyl or alkoxyl group having 1 to 4 carbon atoms.

The polyimide according to this invention may further contain repeating units represented by the formula:

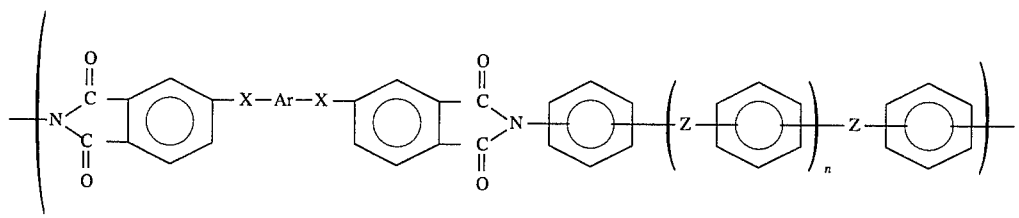
(II)

wherein Z is

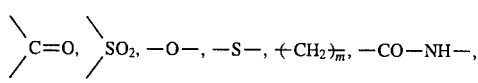

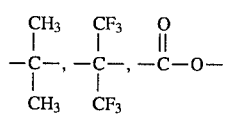

or a direct linkage, a plurality of Z's may be the same or different; m is an integer of 1 or more; n is an integer of 1 to 4; and hydrogen in each benzene ring may be substituted with a substituent such as an alkyl group, an alkoxyl group or a halogen.

In the polyimides of this invention, the repeating units (II) are preferably contained in an amount not greater than 90 mol %. More preferably, in the polyimides of this invention, the repeating units (I) and the repeating units (II) are contained in a (I)/(II) ratio of 90/10 to 10/90, most preferably 90/10 to 40/60. Use of the repeating units (II) enables a further reduction of softening point of polyimides, which leads to improvement of flexibility.

Said polyimides can be produced by reacting an acid dianhydride represented by the formula:

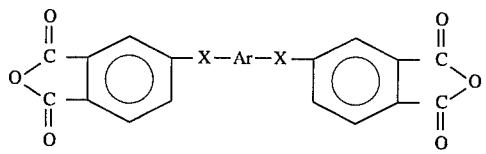
(III)

wherein Ar is a divalent aromatic group; and X is

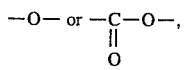

with a compound represented by the formula:

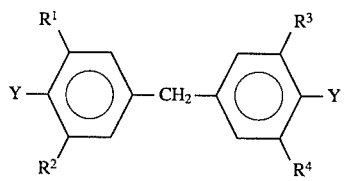
(IV)

wherein Y is an amino group or an isocyanate group; and $R^1$, $R^2$, $R^3$ and $R^4$ represent independently an alkyl or akoxyl group having 1 to 4 carbon atoms.

The acid anhydrides represented by the formula (III) will be described in detail below.

Typical examples of Ar in the formula (III) are divalent groups represented by the following formulae (a) and (b):

(a):

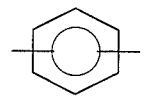

wherein hydrogen in the benzene ring may be substituted with a lower alkyl group such as methyl, ethyl or propyl, a halogen such as chlorine, bromine or fluorine, an alkoxyl group such as methoxy or ethoxy, a fluorine-substituted alkyl group such as trifluoromethyl, pentafluoroethyl, perfluorobutyl, perfluorohexyl or perfluorooctyl, or the like. When there exist two or more of these substituents, such substituents may be the same or different.

(b):

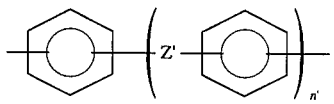

wherein Z' is

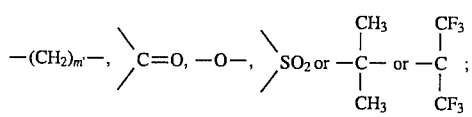

n' and m' are each an integer of 1 or greater; and hydrogen in the benzene ring may be substituted with a lower alkyl group such as methyl, ethyl or isopropyl, a halogen such as chlorine, bromine or fluorine, an alkoxyl group such as methoxy or ethoxy, a fluorine-substituted alkyl group such as trifluoromethyl, pentafluoroethyl, perfluorobutyl, perfluorohexyl or perfluorooctyl, or the like. When there exist two or more of these substituents, such substituents may be the same or different.

Examples of the acid dianhydride represented by the formula (III) are cathecol bistrimellitate dianhydride, resorcinol bistrimellitate dianhydride, dihydroxybenzene bistrimellitate dianhydride, bisphenol A bistrimellitate dianhydride, tetrachlorobisphenol A bistrimellitate dianhydride, tetrabromobisphenol A bistrimellitate dianhydride, biphenyl bistrimellitate dianhydride, and the acid dianhydrides represented by the following formula (B):

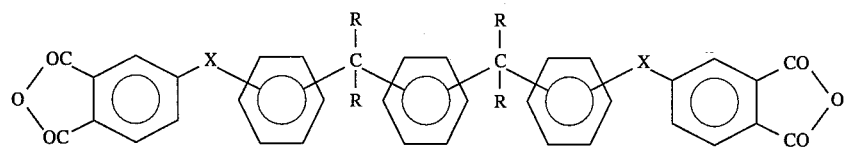 (B)
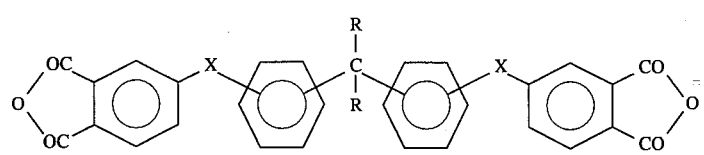 (C)
or the following (C)
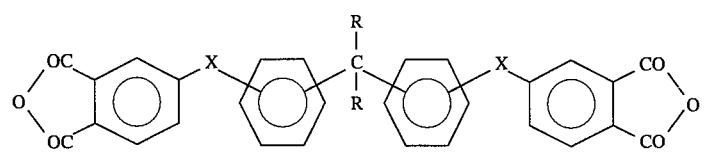 (C)
wherein X is —O— or
and two X's may be the same or different; and R is an alkyl group or a fluoroalkyl group, and R's may be the same or different.
Among the acid dianhydrides represented by the formula (B) or formula (C), those of the following formulae are preferable:
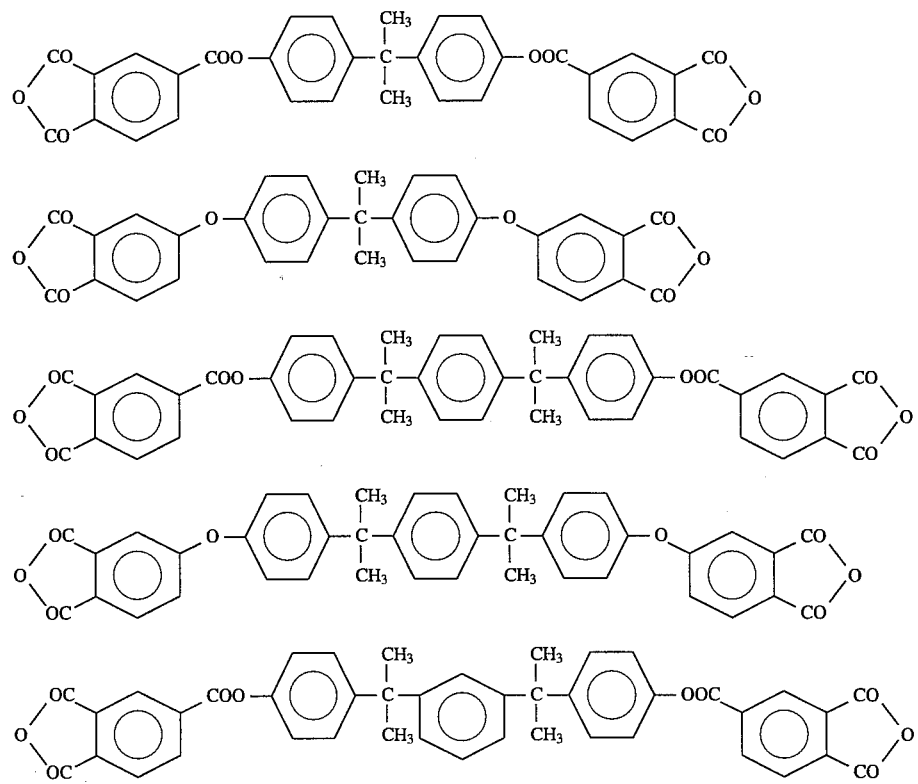

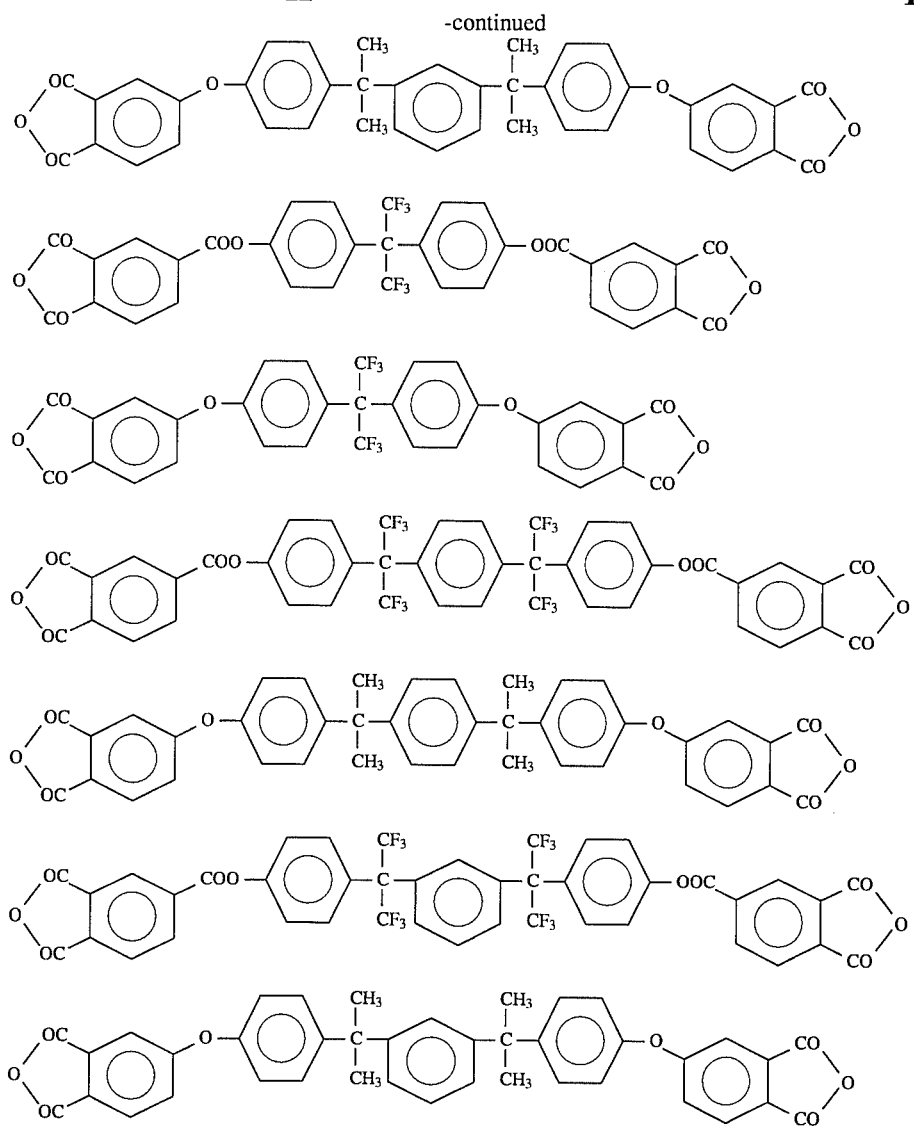

The acid dianhydrides other than those shown above may be used jointly with those shown above within the purpose of this invention. Examples of such acid dianhydrides include 3,3',4,4'-benzophenonetetracarboxylic acid dianhydride, 3,3',4,4'-diphenylsulfonetetracarboxylic acid dianhydride, 4,4'-[2,2,2-trifluoro-1-(trifluoromethyl)ethylidene]bis(1,2-benzenecarboxylic acid anhydride) and the like. The amount of such an acid dianhydride, when used, should be not greater than 50 mol %, preferably not greater than 30 mol % of the total amount of the acid dianhydrides used as reactant.

Among the compounds represented by the formula (IV), those of the formula wherein Y is an amino group include 4,4'-diamino-3,3',5,5'-tetramethyldiphenylmethane, 4,4'-diamino-3,3',5,5'-tetraethyldiphenylmethane, 4,4'-diamino-3,3',5,5'-tetra-n-propyl-diphenylmethane, 4,4'-diamino-3,3',5,5'-tetraisopropyldiphenylmethane, 4,4'-diamino-3,3',5,5'-tetrabutyldiphenylmethane, 4,4'-diamino-3,3'-dimethyl-5,5'-diethyldiphenylmethane, 4,4'-diamino-3,3'-dimethyl-5,5'-diisopropyldiphenylmethane, 4,4'-diamino-3,3'-diethyl-5,5'-diisopropyldiphenylmethane, 4,4'-diamino-3,5-dimethyldimethyl-3',5'-diethyldiphenylmethane, 4,4'-diamino-3,5-dimethyl-3',5'-diisopropyldiphenylmethane, 4,4'-diamino-3,5-diethyl-3',5'-diisopropyldiphenylmethane, 4,4'-diamino-3,5-diethyl-3',5'-dibutyldiphenylmethane, 4,4'-diamino-3,5-diisopropyl-3',5'-dibutyldiphenylmethane, 4,4'-diamino-3,3'-diisopropyl-5,5'-dibutyldiphenylmethane, 4,4'-diamino-3,3'-diethyl-5,5'-dibutyldiphenylmethane, and 4,4'-diamino-3,3'-diethyl-5,5'-dibutyldiphenylmethane.

The compounds of the formula (IV) wherein Y is an isocyanate group include those of the above-mentioned compounds in which "amino" is replaced by "isocyanate".

In the present invention, as the reaction counterpart of an acid dianhydride, there can be used, jointly with a compound of the formula (IV), a compound represented by the formula:

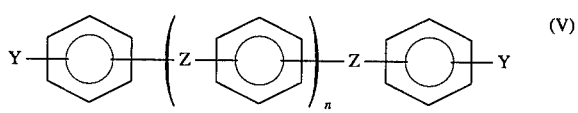

wherein Z is

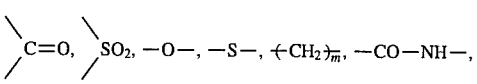

-continued

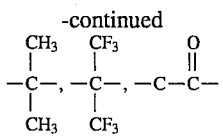

or a direct linkage, and a plurality of Z's may be the same or different; Y is an amino group or an isocyanate group; m is an integer of 1 or more; n is an integer of 1 to 4; and hydrogen in each benzene ring may be substituted with an alkyl group, an alkoxyl group, a halogen, or the like.

Among the compounds represented by the formula (V), represented are those of the formula (V) in which one Z and one Y are bonded to a benzene ring at a para- or meta-position to each other, and two Z's are bonded to a benzene ring at para- or meta-position to each other.

Among the compounds represented by the formula (V), the diamines having an amino group at Y in the formula include bis(anilinoisopropylidene)benzene, bis(aminophenoxy)benzene, bis(aminophenoxyphenyl)propane, bis(aminophenoxyphenyl)sulfone, bis(aminophenoxyphenyl)ketone, bis(aminophenoxyphenyl)hexafluoropropane, 4,4'-bis[3-(4-amino-α,α'-dimethylbenzyl)phenoxy]diphenylsulfone, 4,4'-bis[3-(4-amino-α,α'-dimethylbenzyl)phenoxy]benzophenone, 4,4'-bis[4-(4-amino-α,α'-dimethylbenzyl)phenoxy]diphenylsulfone, 4,4'-bis[4-(4-amino-α,α'-dimethyldibenzyl)phenoxy]benzophenone, 4-[3-(4-amino-α,α'-dimethylbenzyl)phenoxy]-4'-[4-(4-amino-α,α'-dimethylbenzyl)phenoxy]diphenylsulfone, 4-[3-(4-amino-α,α'-dimethylbenzyl)phenoxy]-4'-(4-amino-α,α'-dimethylbenzyl)phenoxy]benzophenone, 4,4'-bis[3-(3-amino-α,α'-dimethylbenzyl)phenoxy]diphenylsulfone, 4,4'-bis[3-(3-amino-α,α'-dimethylbenzyl)phenoxy]benzophenone, 4,4'-bis[2-(4-amino-α,α'-dimethylbenzyl)phenoxy]diphenylsulfone, 4,4'-bis[2-(4-amino-α,α'-dimethylbenzyl)phenoxy]benzophenone, 3,3'-bis[3-(4-amino-α,α'-dimethylbenzyl)phenoxy]diphenylsulfone, and 3,3'-bis[3-(4-amino-α,α'-dimethylbenzyl)phenoxy]benzophenone. These compounds may be used in combination.

Among the compounds represented by the formula (V), the diisocyanates having an isocyanate group at Y include, for example, 4,4'-bis[3-(4-isocyanate-α,α'-dimethylbenzyl)phenoxy]diphenylketone and 4,4'-bis[3-(4-isocyanate-α,α'-dimethylbenzyl)phenoxy]diphenylsulfone.

In the compounds represented by the formula (V) are also included those converted from a diamine into a diisocyanate by replacing an amino group at Y in the formula (V) by an isocyanate group.

A compound of the formula (IV) and a compound of the formula (V) are preferably used in a former: latter molar ratio of 10:90 to 90:10. If this ratio is too low, the produced composition tends to have low solubility in solvents with small polarity. If said ratio is too high, the effect of lowering the softening point of polyimide by use of a compound of the formula (V) is lessened. The especially preferred range of said ratio is 40:60 to 90:10. This range of ratio is particularly desirable in terms of solubility in such solvents as dioxane, diethylene glycol dimethyl ether, ethylene glycol dimethyl ether, and toluene.

In case of using a diamine as the reaction counterpart of the acid dianhydride, the "other diamine" that can be used jointly with said diamine includes, for example, diaminodiphenylmethane, diaminodiphenyl ether, diaminodiphenylsulfone, diaminodiphenyl ketone, diaminodiphenylpropane, phenylenediamine, toluenediamine, diaminodiphenyl sulfide, diaminodiphenylhexafluoropropane and diaminodialkyldiphenylmethane. These additive diamines may be used in combination (as a mixture of two or more of them) within the purpose of this invention.

In case of using a diisocyanate as the reaction counterpart of the acid dianhydride, the diisocyanate that can be used jointly with the diisocyanate such as mentioned above includes diisocyanates converted from said diamines by replacing the amino group in said other diamine with an isocyanate group, such as diphenylmethane diisocyanate and toluene diisocyanate.

Any of said diisocyanates can be prepared by reacting a diamine such as mentioned above with phosgene by a conventional method.

In the present invention, polyimides can be produced by the methods such as described below.

In a method, in case of using a diamine as the reaction counterpart of the acid dianhydride, an acid dianhydride and a diamine are heated in an organic solvent, if necessary in the presence of a catalyst such as tributylamine, triethylamine, triphenyl phosphite or the like at a temperature above 100° C., preferably above 180° C., this treatment being continued until imidization is completed or almost completed. (In this method, a catalyst is used preferably in an amount of 0 to 15% by weight, more preferably 0.01 to 15% by weight based on the total amount of the reactants). In another method, an acid dianhydride and a diamine are reacted in an organic solvent at a temperature below 100° C. to once produce a varnish of a polyamide acid which is a precursor of polyimide, and said varnish is heated to imidize the polyamide acid, or chemical ring closure (imidization of the polyamide acid) is caused by adding to the varnish an acid anhydride such as acetic anhydride, propionic anhydride, benzoic anhydride and the like, a ring-closing agent, e.g. a carbodiimide compound such as dicyclohexylcarbodiimide, and if necessary a ring-closing catalyst such as pyridine, isoquinoline, trimethylamine, aminopyridine, imidazole and the like. (Each of the ring-closing agent and ring-closing catalyst is preferably used in an amount within the range of 1 to 8 moles per mole of the acid anhydride).

As the organic solvent in the above process, there can be used aprotic polar solvents such as N-methyl-pyrrolidone, N,N-dimethylacetamide, N,N-dimethylformamide, dimethyl sulfoxide, sulfolane, hexamethylphosphoric acid triamide and 1,3-dimethyl-2-imidazolidone, and phenolic type solvents such as phenol, cresol, xylenol and p-chlorophenol.

As the solvent, in a variety of solvents such as benzene, toluene, xylene, methyl ethyl ketone, acetone, tetrahydrofuran, dioxane, diethylene glycol dimethyl ether, ethylene glycol dimethyl ether, methyl Cellosolve, Cellosolve acetate, methanol, ethanol, isopropanol, methylene chloride, chloroform, trichloroethylene, tetrachloroethane and the like, those which are capable of dissolving the starting monomers and polyimide or polyamide acid can be used. Those which are incapable of dissolving said compound may also be used in combination with another solvent capable of dissolving said compounds.

For the preparation of said polyimides and the polyamide acids which are precursor of polyimides, it is possible to utilize a solid phase reaction or a fusion reaction at a temperature below 300° C.

In case of using a diisocyanate as the reaction counterpart of the acid dianhydride, the above-said method for directly obtaining a polyimide can be employed. In this case, however, the reaction temperature is not specifically defined; it is merely required that the reaction temperature is not lower than room temperature, preferably not lower than 60° C.

In the present invention, an acid dianhydride and its reaction counterpart are preferably used in a substantially equal molar ratio, but it is allowed that one of said reactants be used in an excess amount of up to 10 mol %, preferably up to 5 mol %.

In the present invention, it is possible to obtain the polyimides low in softening point and soluble in even low-boiling solvents by using the acid dianhydrides represented by the formula (III) and, as reaction counterpart thereof, the compounds represented by the formula (IV). In view of the prior art knowledges, when an acid dianhydride represented by the formula (III) is used, the obtained polyimide not always has a low softening point or is not always soluble in low-boiling solvents. Also, the use of a compound represented by the formula (IV) does not always provide a polyimide which is low in softening point or soluble in low-boiling solvents. In view of the above, it may be said that the properties such as mentioned above of the polyimides obtained according to the present invention represent the specific properties derived from a combination of said compounds. It was further clarified in the present invention that when a compound represented by the formula (V) is used in combination with a compound of the formula (IV) as the reaction counterpart of the acid dianhydride of the formula (III), the obtained polyimide is not only further lowered in softening point but also even more improved in solubility in low-boiling point solvents with small polarity. Also, joint use of a compound of the formula (V) is more preferable in affording flexibility to the produced polyimide. Solubility of polyimides in low-boiling solvents leads to better workability in use of a varnish obtained by dissolving a polyimide or a polyimide and a polymaleimide in a low-boiling solvent than when dissolving them in such a solvent as N,N-dimethylformamide, N-methylpyrrolidone or the like. Said solubility also has a merit of enabling drying at a lower temperature when forming a coat, film or such from said varnish by cast coating or other means.

The thermosetting resin composition according to the present invention comprises (A) a polyimide such as mentioned above and (B) a polymaleimide represented by the formula:

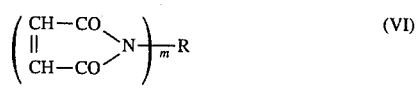

wherein R is a group having valency of 2 or more, and m is an integer of 2 or greater.

Examples of the polymaleimide (VI) defined above are N,N'-(4,4'-diphenylmethane)bismaleimide, N,N'-(4,4'-diphenyloxy)bismaleimide, N,N'-p-phenylenebismaleimide, N,N'-m-phenylenebismaleimide, N,N'-2,4-tolylenebismaleimide, N,N'-2,6-tolylenebismaleimide, N,N'-ethylenebismaleimide, N,N'-[4,4'-{2,2'-bis(4,4'-phenoxyphenyl)isopropylidene}]bismaleimide, N,N'-hexamethylenebismamelimide, and the compounds having the following structural formulae:

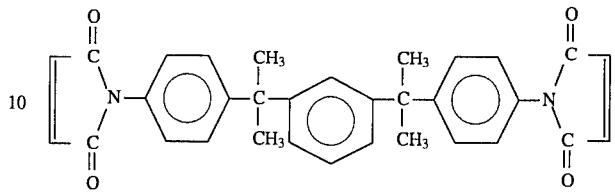

(this compound is hereinafter referred to as MBIM),

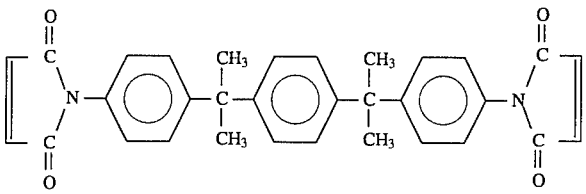

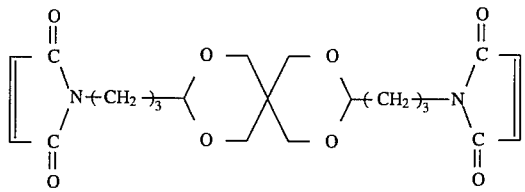

(this compound is hereinafter referred to as ATUBMI),

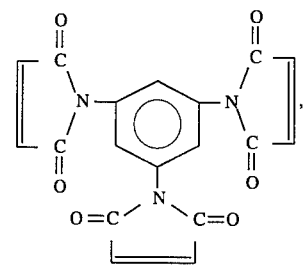

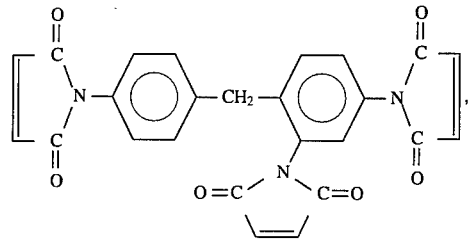

-continued

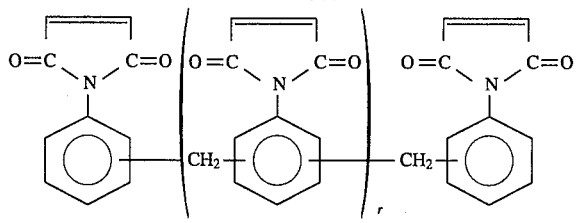

wherein r is an integer. These compounds may be used either singly or in combination.

The mixing ratio of (A) polyimide to (B) polymaleimide may be properly determined according to the purpose of use of the product and other factors, but usually it is preferred to use (B) polymaleimide in an amount of 5 to 180 parts by weight per 100 parts by weight of (A) polyimide. A too small amount of (B) polymaleimide causes insufficient curing, while a too much amount thereof makes the resin composition brittle. In case of producing a self-supporting film, it is recommended to use (B) polymaleimide in a ratio of less than 100 parts by weight per 100 parts by weight of (A) polyimide for retaining a sufficient level of flexibility.

With the resin compositions of this invention, it is possible to obtain cured products showing high heat resistance and other excellent properties by curing said compositions at a temperature lower than 275° C. (the temperature may be even lower than 230° C.). For enabling curing at even lower temperatures, it is advisable to blend a radical polymerization initiator, for example, an organic peroxide such as t-butyl perbenzoate, t-butyl hydroperoxide, benzoyl peroxide and 2,5-dimethyl-2,5-di(t-butyl peroxide)hexine-3. This makes it possible to let the curing reaction take place and proceed at a temperature around 200° C. The radical polymerization initiator is preferably used in an amount of 0.1 to 10% by weight based on the total amount of (A) polyimide and (B) polymaleimide.

The resin compositions of this invention may be offered as a powdery mixture prepared by mixing (A) polyimide, (B) polymaleimide and, as desired, a radical polymerization initiator. Also, they may be provided as a fluid (such as varnish) by dissolving said materials in an organic solvent. The organic solvents usable in this preparation include not only non-aqueous polar solvents such as N,N-dimethylformamide and N-methylpyrrolidone but also low-boiling point solvents including ether type solvents such as dioxane, tetrahydrofuran, diethylene glycol dimethyl ether, ethylene glycol dimethyl ether, chlorine type solvents such as methylene chloride and aromatic type solvents such as toluene, and other organic solvents with small polarity.

The resin compositions of this invention can be manufactured into a cured film by casting the composition onto a glass plate, stainless steel plate or the like, drying and then heating the coat to effect curing. This film is useful as an insulating film, base film for laminates and so on.

The resin compositions according to the present invention can be used per se as an adhesive. This adhesive may be offered to use in the form of varnish, or the varnish may be cast onto a substrate such as a glass plate, stainless plate, etc., dried and then peeled off to obtain a flexible non-cured film adhesive (self-supporting type film adhesive) without substrate. Such an adhesive can be used for various purposes, and it finds particularly useful application as an adhesive for producing the metal-clad laminates by bonding a metal foil such as copper foil or aluminum foil to a substrate, for example, a metal plate such as aluminum plate or a plastic film such as polyimide film. Further, this adhesive shows high adhesiveness on heating at a relatively low temperature (curing temperature).

The resin compositions of this invention can be used as a prepreg by impregnating the varnish of the resin composition into a substrate such as glass cloth, carbon cloth, etc., and drying the varnish.

In the production of said film adhesives and prepregs, drying temperature and drying time are variable depending on the type of solvent and polymaleimide used. The temperature needs to be maintained below the level at which the polymerization of polymaleimide is activated, but since the resin compositions of this invention can be dissolved in the low-boiling point solvents or the volatile organic solvents with small polarity, drying can be accomplished at a notably low temperature. Even when a radical polymerization initiator is present, drying can be easily attained by suppressing the polymerization reaction. Preferably, drying is lasted for a period in which the residual amount of solvent becomes less than 5% by weight.

The resin compositions of this invention can be also used as a molding material in a powdery form. The curing temperature is variable according to the type of polymaleimide used, but it is possible to obtain a tough heat-resistant molded product by heating and curing the composition.

The polyimides obtained according to the present invention can be used as molding material, adhesive, structural material, etc.

The present invention will hereinafter be described more particularly by showing examples thereof, which examples, however, are merely intended to be illustrative and not to be construed as limiting the scope of the invention.

EXAMPLE 1

In a four-necked flask equipped with a stirrer, a thermometer, a nitrogen gas inlet tube and a calcium filled tube, were placed 2.745 g (7.5 mmol) of 4,4'-diamino-3,3',5,5'-tetraisopropyldiphenylmethane (IPDDM), 1.025 g (2.5 mmol) of 2,2-bis[4-(4-aminophenoxy)phenyl]propane (BAPP) and 28.6 g of N,N-dimethylformamide (DMF) to form a solution. Then 5.76 g (10.0 mmol) of bisphenol A bistrimellitate dianhydride (BABT) was added in several parts to the solution while keeping at a temperature at or below 5° C., and then the mixture was reacted for one hour with cooling to keep the temperature at or below 5° C. and further reacted at room temperature for 6 hours to give a polyamide acid varnish. To the varnish were added 2.55 g of acetic anhydride and 1.98 g of pyridine, and the mixture was stirred at room temperature for 3 hours to give a polyimide varnish. The varnish was poured into water to precipitate the polyimide, which was separated, crushed and dried to give a polyimide powder.

This polyimide powder was dissolved in DMF to a concentration of 0.1 g/dl. The reduced viscosity of the solution when measured at 30° C. was 1.35 dl/g. FIG. 1 shows an IR absorption spectrum of the polyimide obtained here.

The solubility tests were conducted by adding the obtained polyimide powder in various organic solvents to a concentration of 5% by weight and observing the state of dissolution at room temperature. The results showed that said polyimide powder was soluble in DMF, N-methylpyrrolidone (NMP), dioxane, tetrahydrofuran (THF), methylene chloride, diethylene glycol dimethyl ether, ethylene glycol dimethyl ether, and toluene.

Further, said polyimide powder was dissolved in DMF. The resulting varnish was cast onto a glass plate, dried at 80° C. for 10 minutes, then peeled off, set on an iron frame and further dried at 150° C. for one hour to obtain a film.

Said polyimide powder was also dissolved in toluene, and the obtained varnish was cast onto a glass plate, dried at 70° C. for 10 minutes, then peeled off, set on an iron frame and further dried at 150° C. for 30 minutes to obtain a film.

By using the films thus obtained, the softening point of the polyimide was measured according to the penetration method under the conditions of 25 kg/cm² loading and 10° C./min heating rate. The results showed that the softening point of the-polyimide was 260° C. in all cases. Also, in the flexibility tests conducted by bending each of the obtained films to an angle of 180°, all of the films had no crack and showed good flexibility.

The polyimide obtained in this Example consisted of 75 mol % of the following repeating units α and 25 mol % of the following repeating units β.

Repeating units α:

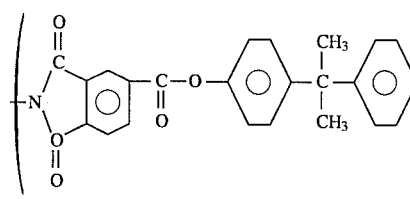

Repeating units β:

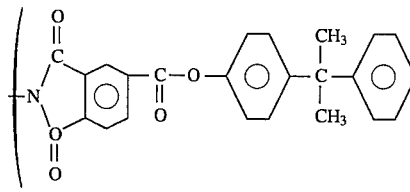

EXAMPLE 2

Figure 2:
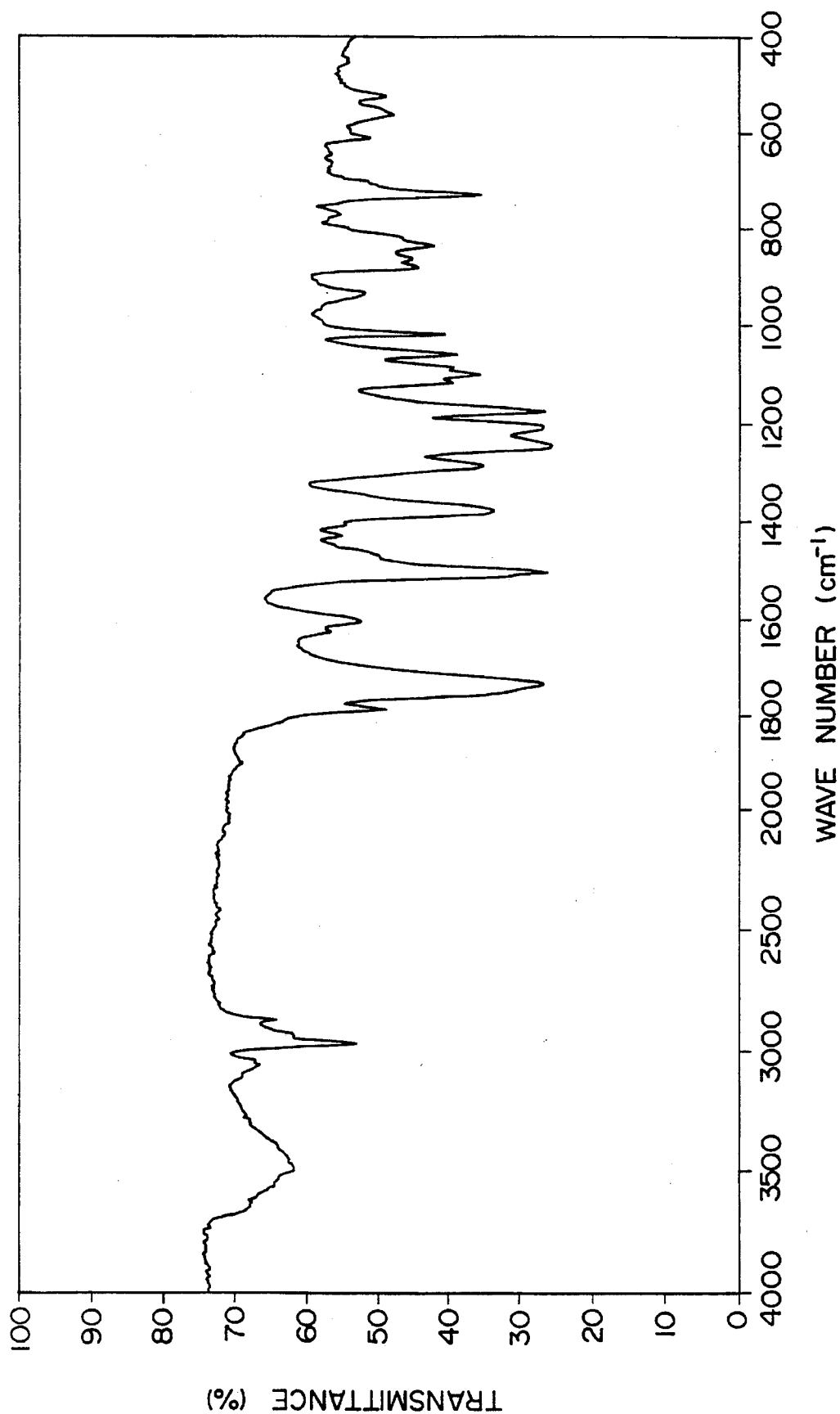
FIG. 2 is an IR absorption spectrum of the polyimide obtained in Example 2.

A polyimide powder was obtained by following the procedure of Example 1 except that IPDDM and BAPP were used in the amounts of 0.915 g (2.5 mmol) and 3.075 g (7.5 mmol), respectively. This polyimide powder was subjected to determination of reduced viscosity and solubility test according to the methods of Example 1. The results showed that this polyimide powder had a reduced viscosity of 1.52 dl/g and was soluble in DMF, NMP, THF, dioxane, methylene chlofide and diethylene glycol dimethyl ether. FIG. 2 shows an IR absorption spectrum of the obtained polyimide. Further, by using said polyimide powder, a film was produced according to the method of Example 1 using DMF. A film was also made in the same way except for use of diethylene glycol dimethyl ether in place of DMF. These films were subjected to determination of softening point of polyimide and flexibility test according to the methods used in Example 1. The softening point of the polyimide was 230° C. in each case, and each of the films obtained had excellent flexibility.

The polyimide obtained in this Example comprised 25 mol % of said repeating units α and 75 mol % of said repeating units β.

EXAMPLE 3

A polyimide powder was obtained by following the procedure of Example 1 except that IPDDM and BAPP were used in the amounts of 1.83 g (5.0 mmol) and 2.05 g (5.0 mmol), respectively, and the obtained polyimide powder was subjected to determination of reduced viscosity and solubility test according to the methods of Example 1. The results showed that this polyimide powder had a reduced viscosity of 1.28 dl/g and was soluble in DMF, NMP, THF, dioxane, methylene chloride and diethylene glycol dimethyl ether. Further, by using said polyimide powder, a film was produced according to the process of Example 1 in the case of using DMF, and the obtained film was subjected to determination of softening point of polyimide and flexibility test in the same ways as in Example 1. The softening point of the polyimide was 240° C. and the obtained film had

Figure 3:
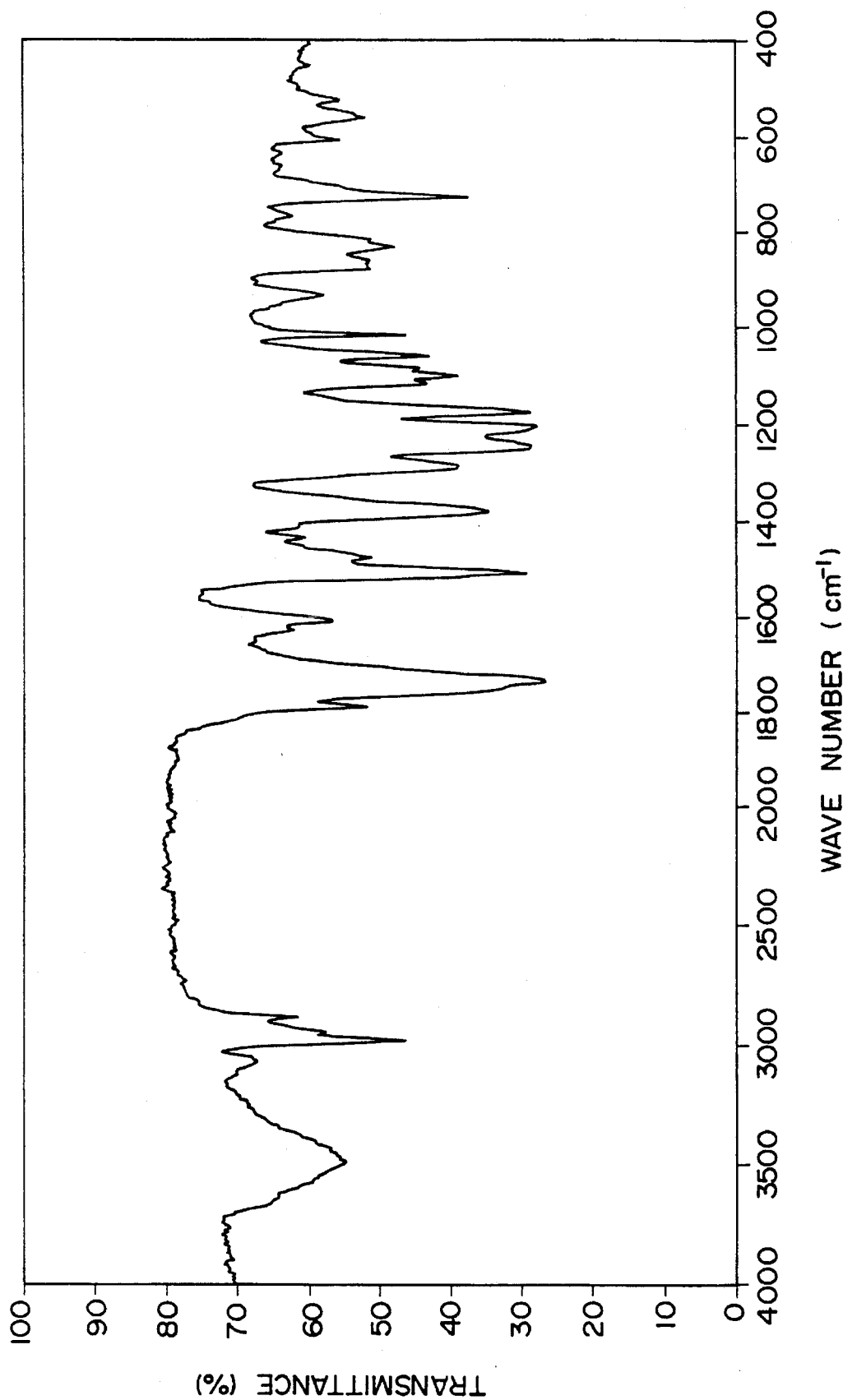
FIG. 3 is an IR absorption spectrum of the polyimide obtained in Example 3.

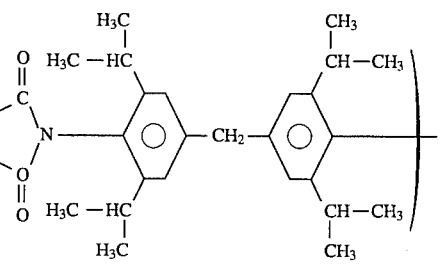

excellent flexibility. FIG. 3 shows an IR absorption spectrum

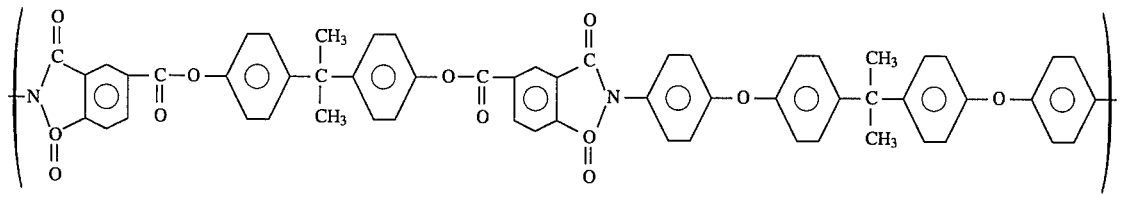

of said polyimide.

The polyimide obtained in this Example consisted of 50 mol % of said repeating units α and 50 mol % of said repeating units β.

EXAMPLE 4

Figure 4:
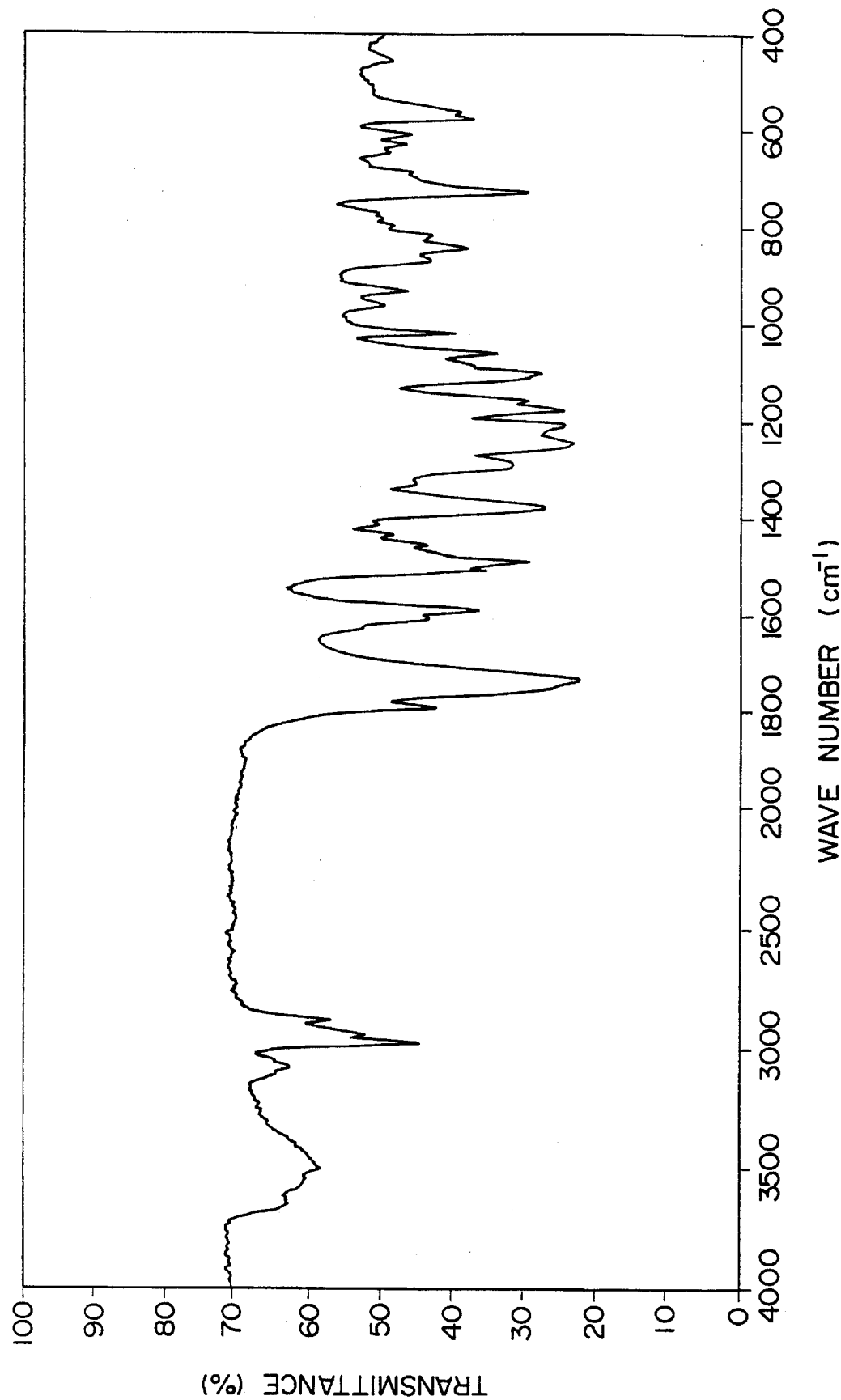
FIG. 4 is an IR absorption spectrum of the polyimide obtained in Example 4.

A polyimide powder was obtained by following the procedure of Example 3 except that 2.16 g (5.0 mmol) of bis[4-(3-aminophenoxy)phenyl]sulfone (m-APPS) was used in place of 2.05 g of BAPP, and this polyimide powder was subjected to determination of reduced viscosity and solubility test in accordance with the procedure of Example 1. FIG. 4 shows an IR absorption spectrum of the polyimide. The obtained polyimide powder had a reduced viscosity of 1.02 dl/g and was soluble in DMF, NMP, dioxane, methylene chloride and diethylene glycol dimethyl ether. Further, by using said polyimide powder, a film was produced by following the process of Example 1 where DMF was used. A film was also made in the same way except that dioxane was used in place of DMF. These films were subjected to determination of softening point of polyimide and flexibility test according to the methods of Example 1. The softening point of the polyimide was 245° C. in determination on both films, and both films had excellent flexibility.

The polyimide obtained in this Example comprised 50 mol % of said repeating units α and 50 mol % of the repeating units γ shown below.
Repeating units γ:

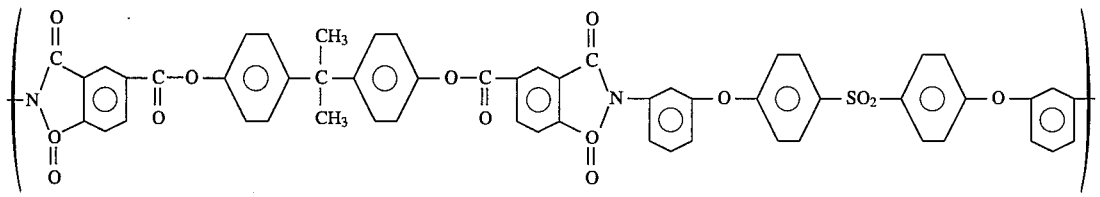

EXAMPLE 5

Figure 5:
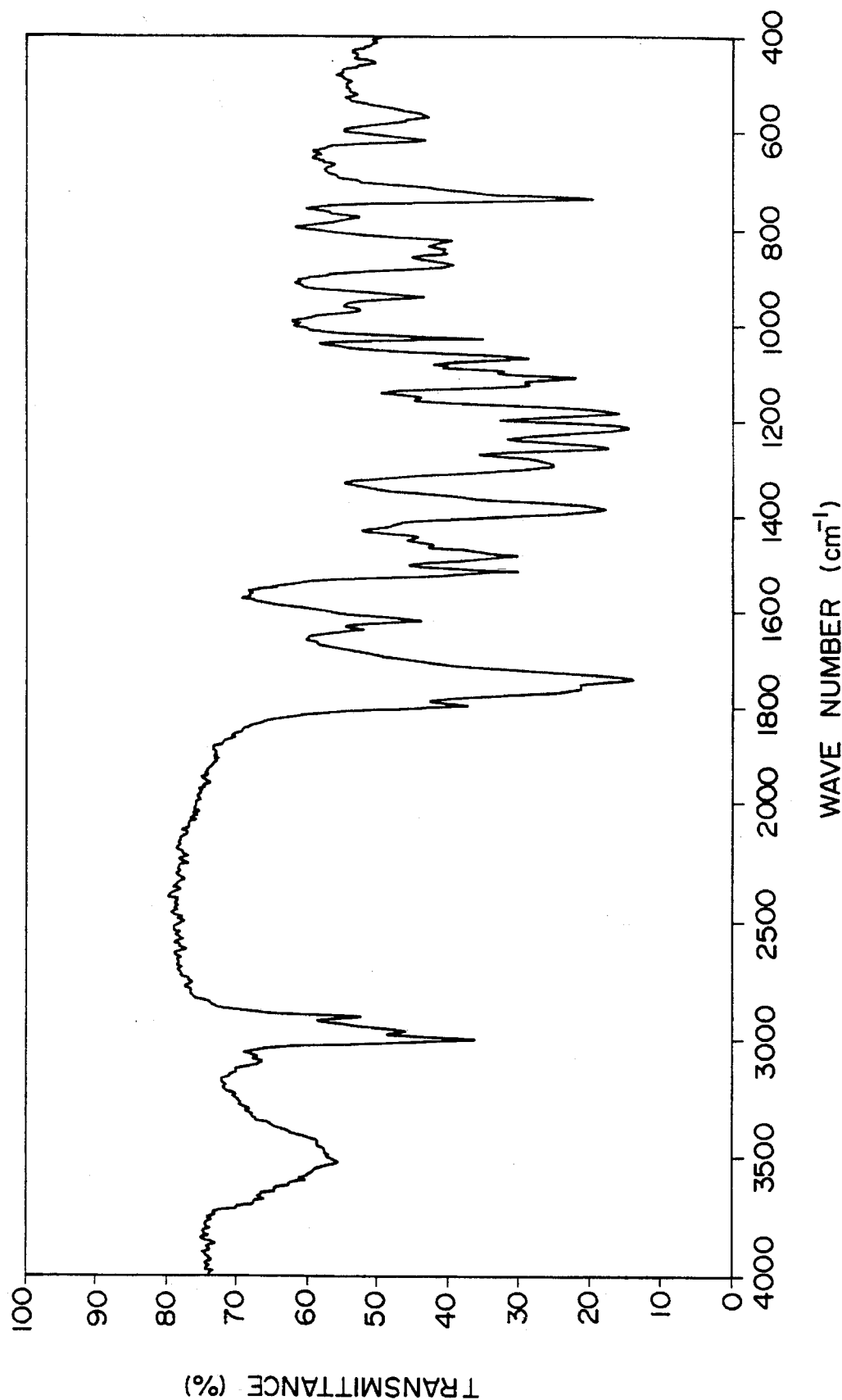
FIG. 5 is an IR absorption spectrum of the polyimide obtained in Example 5.

A polyimide powder was obtained according to the same process as Example 1 except that the amount of IPDDM used was increased to 3.66 g (10.0 mmol) and that no BAPP was used. The obtained polyimide powder had a reduced viscosity of 0.35 dl/g as measured according to the method of Example 1, and the solubility test conducted in the same way as Example 1 showed that said polyimide powder was soluble in DMF, NMP, THF, dioxane, methylene chloride, diethylene glycol dimethyl ether and toluene. FIG. 5 shows an IR absorption spectrum of the polyimide obtained. By using said polyimide powder, a film was made according to the process of Example 1 using DMF, and the obtained film was subjected to determination of softening point of the polyimide and flexibility test according to Example 1. The result showed that the polyimide had a softening point of 275° C. The film cracked in the course of the flexibility test, indicating brittleness of the film.

The polyimide obtained in this Example comprised 100 mol % of the repeating units α.

EXAMPLE 6

A polyimide powder was obtained by following the procedure of Example 1 except that 6.94 g (10.0 mmol) of absorption spectrum of the polyimide obtained. The results showed that this polyimide powder had a reduced viscosity of 0.92 dl/g and was soluble in DMF, NMP, dioxane, THF, methylene chloride, diethylene glycol dimethyl ether, ethylene glycol dimethyl ether and toluene. By using this polyimide powder, a film was manufactured according to the method using DMF of Example 1.

In another operation, said polyimide powder was dissolved in ethylene glycol dimethyl ether to prepare a varnish and this varnish was cast onto a glass plate, dried at 70° C. for 10 minutes, peeled off, set on an iron frame and further dried at 150° C. for 30 minutes to obtain a film.

These films were subjected to determination of softening point of polyimide and flexibility test according to Example 1. The softening point of the polyimide was 235° C. in both cases, and also both films had good flexibility.

Figure 6:
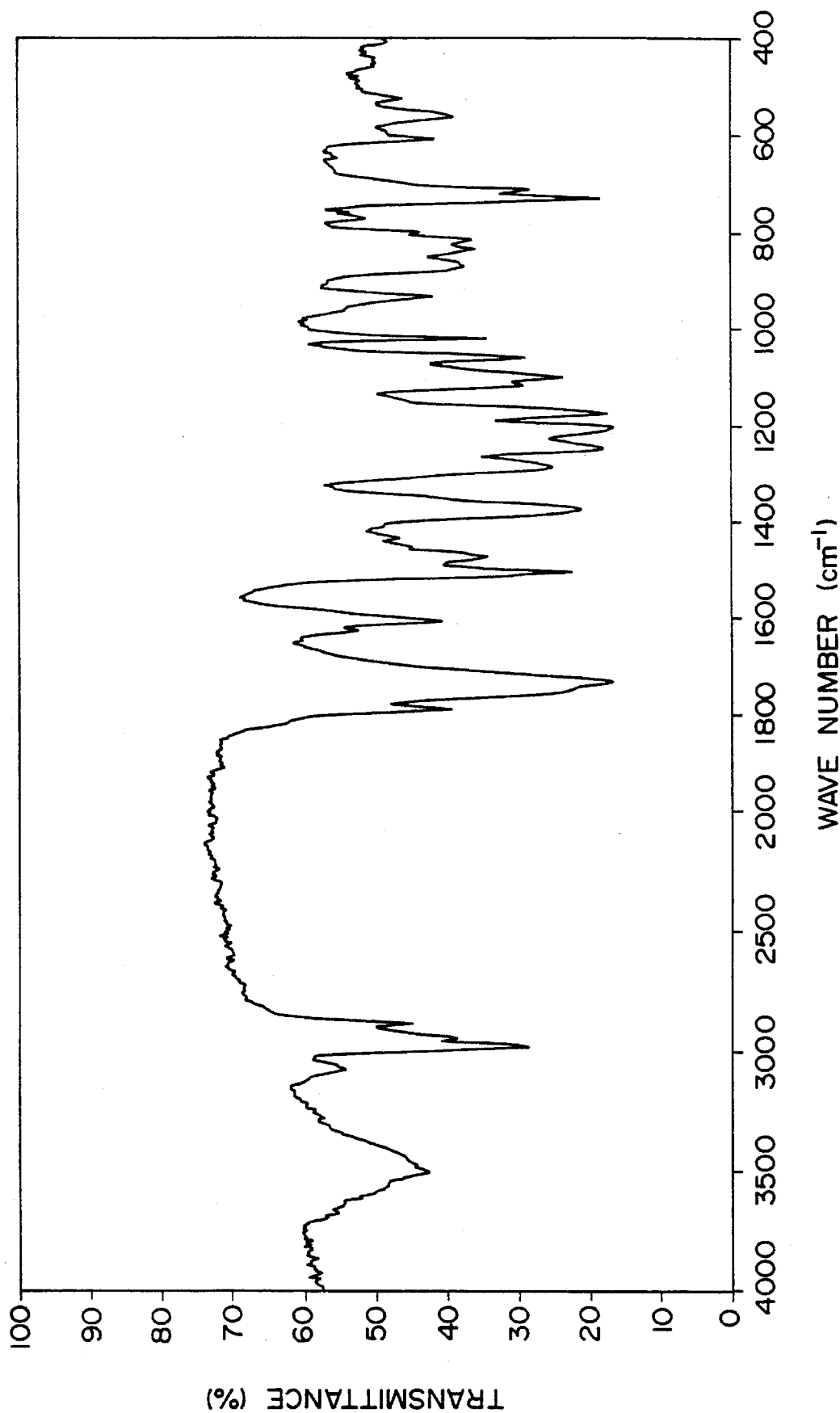
FIG. 6 is an IR absorption spectrum of the polyimide obtained in Example 6.

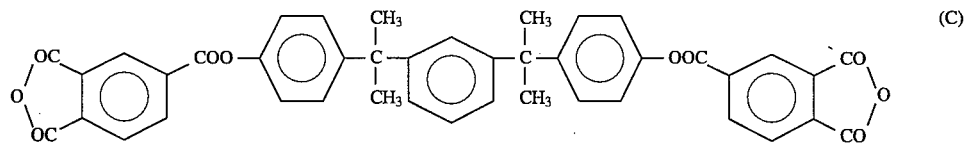

an acid dianhydride of the formula (C) shown below in place of 5.67 g of BABT, and the obtained polyimide powder was subjected to determination of reduced viscosity and solubility test according to Example 1. FIG. 6 shows an IR The polyimide obtained in Example 6 comprised 75 mol % of the repeating units δ shown below and 25 mol % of the repeating units ε shown below.
Repeating units δ:

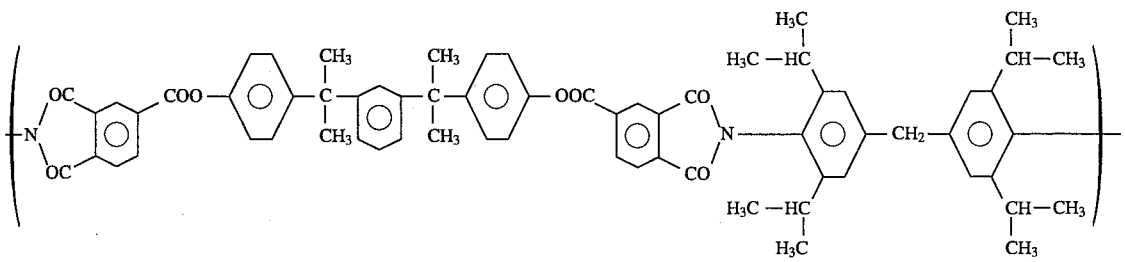

Repeating units ε:

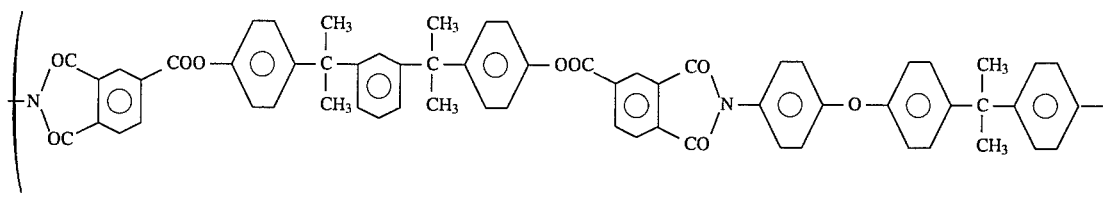

EXAMPLE 7

Figure 7:
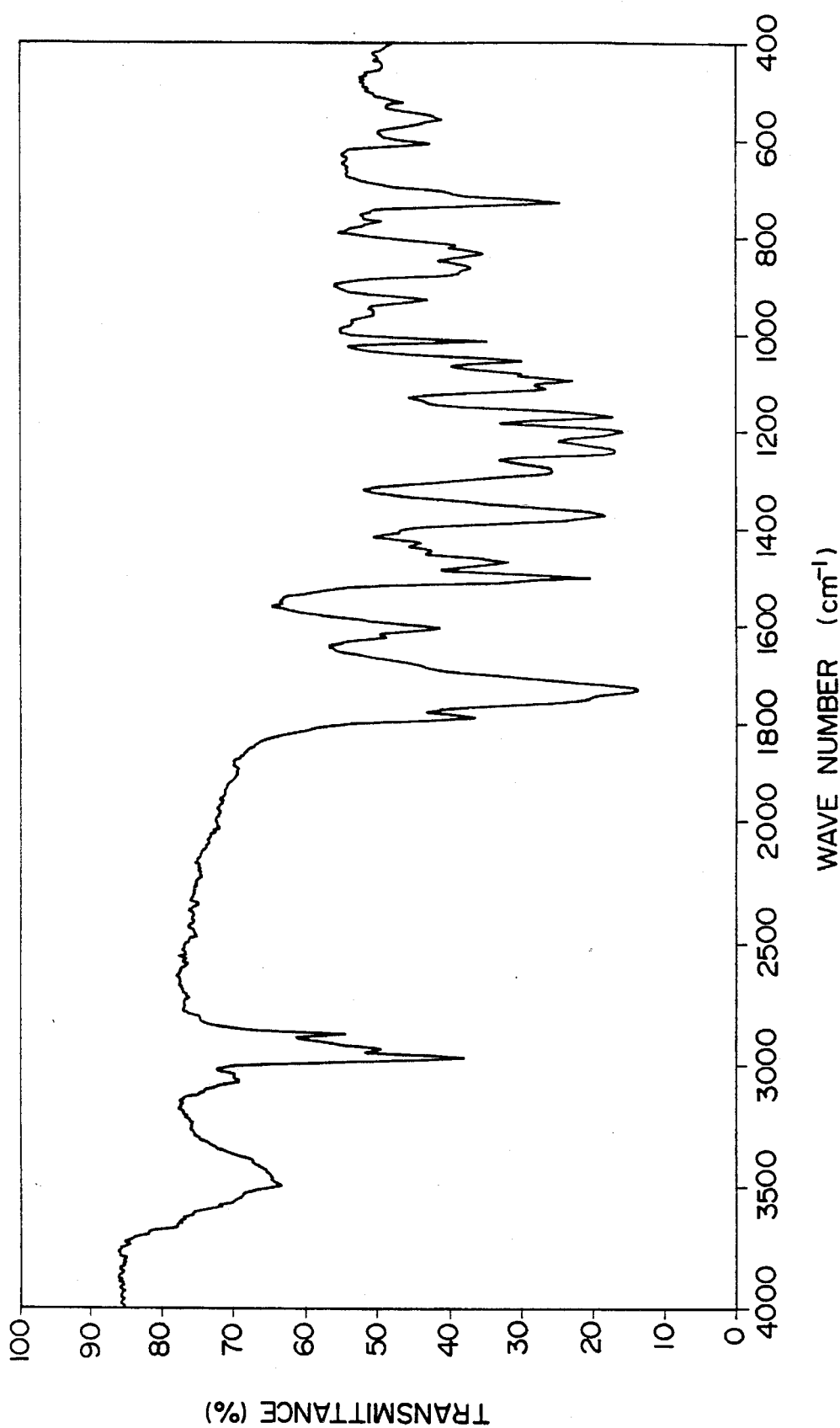
FIG. 7 is an IR absorption spectrum of the polyimide obtained in Example 7.

A polyimide powder was obtained by following the same procedure as Example 1 except that 4.32 g (7.5 mmol) of BABT and 0.81 g (2.5 mmol) of 3,3',4,4'-benzophenonetetracarboxylic acid dianhydride were used in place of 5.67 g of BABT, and the obtained polyimide powder was subjected to determination of reduced viscosity and solubility test according to Example 1. The results showed that this polyimide powder had a reduced viscosity of 0.56 dl/g and was soluble in DMF, NMP, THF, methylene chloride, diethylene glycol dimethyl ether, ethylene glycol dimethyl ether and toluene. FIG. 7 shows an IR absorption spectrum of the obtained polyimide. By using said polyimide powder, a film was produced according to the process of Example 1 in the case of using toluene (a varnish was prepared and cast into a film), and this film was subjected to determination of softening point of polyimide and flexibility test according to Example 1. The softening point of the polyimide was 265° C., and the film had excellent flexibility.

EXAMPLE 8

Figure 8:
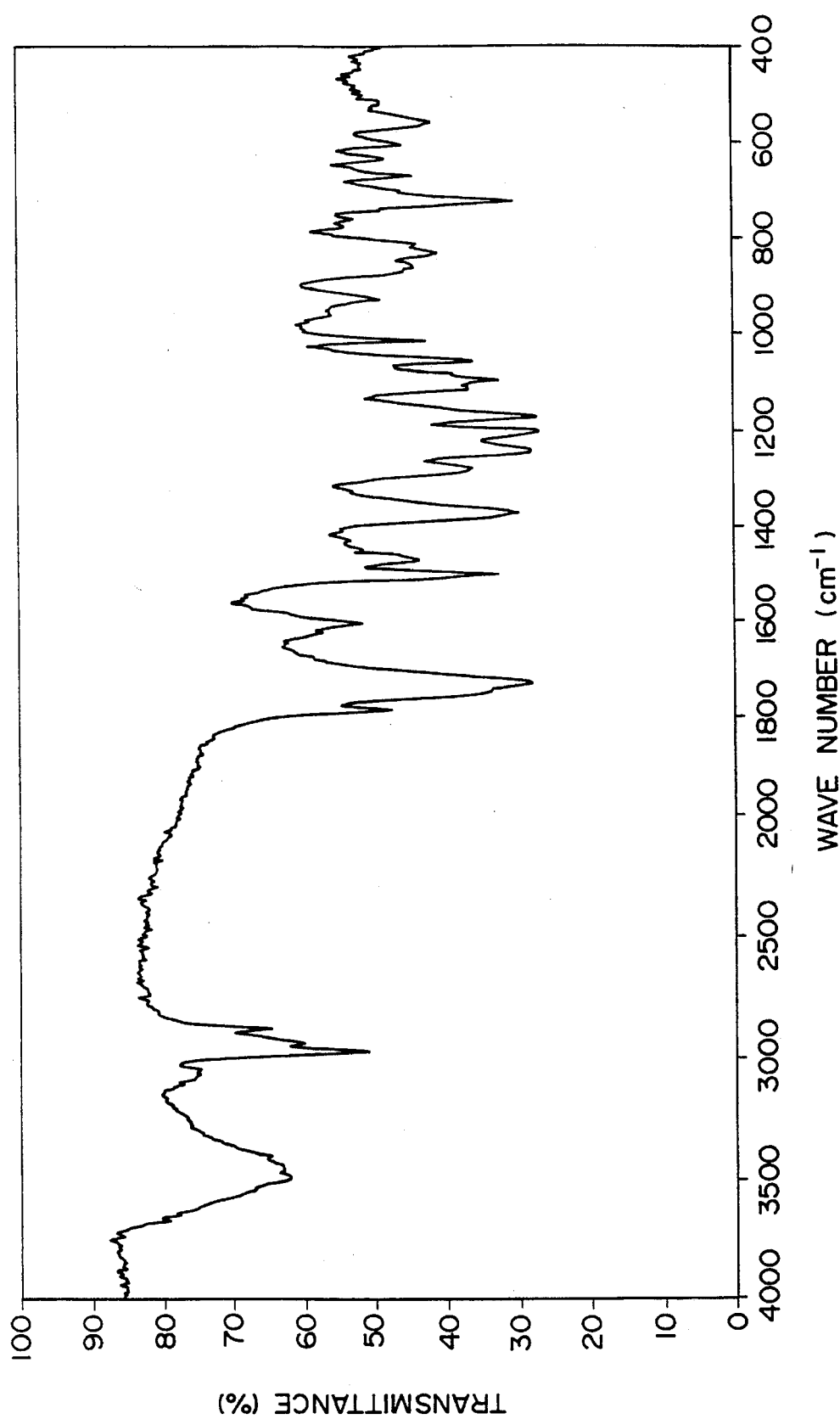
FIG. 8 is an IR absorption spectrum of the polyimide obtained in Example 8.

A polyimide powder was obtained by following the procedure of Example 1 except that 4.32 g (7.5 mmol) of BABT and 0.90 g (2.5 mmol) of 3,3',4,4'-diphenylsulfone-tetracarboxylic acid dianhydride were used in place of 5.67 g of BABT. The obtained polyimide powder had a reduced viscosity of 0.65 dl/g as measured by the method of Example 1, and the result of the solubility test conducted according to Example 1 showed that said polyimide powder was soluble in DMF, NMP, dioxane, THF, methylene chloride, diethylene glycol dimethyl ether ethylene glycol dimethyl ether and toluene. FIG. 8 shows an IR absorption spectrum of the polyimide obtained here.

By using said polyimide powder, a film was manufactured according to the process of Example 1 in the case of using toluene, and the obtained film was subjected to determination of softening point of polyimide and flexibility test according to Example 1. The results showed that the softening point of the polyimide was 268° C. and the obtained film had excellent flexibility.

Comparative Example 1

A polyamide acid was synthesized according to the process of Example 1 except that 3.22 g (10.0 mmol) of 3,3',4,4'-benzophenonetetracarboxylic acid dianhydride (BTDA) was used in place of 5.67 g of BABT. When it was tried to imidize the product by adding a mixed solution of acetic anhydride and pyridine to a varnish of the obtained polyamide acid, the whole substance was reduced into a gel.

Comparative Example 2

A polyimide powder was obtained by following the procedure of Example 1 except that 4.32 g (10.0 mmol) of m-APPS was used instead of using 2.745 g of IPDDM and 1.025 g of a BAPP. By using this polyimide powder and a film made by using it as described in Example 1, determination was made of reduced viscosity and softening point and the solubility test and flexibility test were conducted according to Example 1. The results showed that said polyimide powder had a reduced viscosity of 0.54 dl/g and was soluble in DMF and NMP but insoluble in THF, dioxane, methylene chloride, diethylene glycol dimethyl ether, ethylene glycol dimethyl ether and toluene. It was also found that the softening point of the obtained polyimide was 215° C. and the film formed by using said polyimide powder had excellent flexibility.

Comparative Example 3

A polyimide powder was obtained by following the procedure of Example 1 except that 4.10 g (10.0 mmol) of BAPP was used instead of using 2.745 g of IPDDM and 1.025 g of BAPP, and the obtained polyimide powder was subjected to determination of reduced viscosity and softening point and solubility test according to Example 1. The results showed that this polyimide powder had a reduced viscosity of 1.50 dl/g and was soluble in DMF, NMP, THF and methylene chloride but insoluble in dioxane, diethylene glycol dimethyl ether, ethylene glycol dimethyl ether and toluene. The softening point of the obtained polyimide was 225° C.

Comparative Example 4

A polyimide powder was obtained by following the procedure of Example 1 except that 2.48 g (10.0 mmol) of 4,4'-diaminodiphenylsulfone was used instead of using 2.745 g of IPDDM and 1.025 g of BAPP, and the obtained polyimide powder was subjected to said determinations and solubility test. It was found that this polyimide powder had a reduced viscosity of 0.44 dl/g and was soluble in DMF and NMP but insoluble in diethylene glycol dimethyl ether, ethylene glycol dimethyl ether and toluene, and that the softening point of the obtained polyimide was 285° C.

EXAMPLE 9

100 g of the polyimide powder obtained in Example 1 and 50 g of 2,2-bis[4-(4-maleimidephenoxy)phenyl]propane (BBMI) were added to 400 g of N,N-dimethylformamide, and to this solution was added 3 g of t-butyl peroxybenzoate to obtain a resin composition (varnish). This resin composition was cast onto a glass plate, dried at 80° C. for 30 minutes and then peeled off to obtain a film. This film was set on an iron frame and dried well by further heating at 150° C. for one hour to obtain an uncured film adhesive. This film adhesive had a thickness of 25 μm and a softening point of 167° C. and didn't crack even when bent through the angle of 180°, indicating excellent flexibility of this film adhesive.

When this film adhesive was perfectly cured by heating at 200° C. for 2 hours, the obtained cured film showed a glass transition point of 202° C. and an elongation of 7.6%.

This film adhesive was sandwiched between a 50 μm thick polyimide film and a 35 μm thick copper foil roughened on one side and pressed under the conditions of 30 kgf/cm$^2$, 200° C. and 2 hours to obtain a flexible substrate for printed wiring boards. The 90° copper foil peel strength of this substrate was 1.3 kgf/cm at room temperature and 1.2 kgf/cm at 200° C. (both measured at a pulling rate of 50 mm/min). Also, when this substrate was dipped in a solder bath of 300° C. for 60 seconds, there took place no blistering nor peeling.

EXAMPLE 10

A film adhesive was obtained by following the procedure of Example 9 except that 30 g of the above-mentioned bismaleimide ATUBMI in place of BBMI. The obtained film adhesive had a thickness of 25 μm, a softening point of 172° C. and so excellent flexibility that it didn't crack even when bent by 180°.

When this film adhesive was perfectly cured by heating at 200° C. for one hour, the resulting cured film had a glass transition temperature of 207° C. and an elongation of 11.0%.

By subjecting this cured film adhesive to the same treatments as conducted in Example 9 (except that the pressing time was one hour), there was obtained a flexible substrate for printed wiring boards. The 90° copper foil peel strength of this substrate was 1.1 kgf/cm at both room temperature and 200° C. (measured at the pulling rate of 50 mm/min). Also, when this substrate was dipped in a 300° C. solder bath for 60 seconds, there occurred no blistering nor peeling.

EXAMPLE 11

A film adhesive was obtained by following the procedure of Example 10 except that the amount of ATUBMI used was changed to 50 g. The obtained film adhesive was 25 μm thick and had a softening point of 147° C. and so excellent flexibility that it didn't crack even when bent by 180°.

By using this film adhesive, there was obtained a flexible substrate for printed wiring boards according to the same process as used in Example 9. The 90° copper foil peel strength of this substrate was 0.9 kgf/cm at both room temperature and 200° C. (measured at the pulling rate of 50 mm/min). Also, when this substrate was dipped in a 300° C. solder bath for 60 seconds, the substrate remained free of blister and peeling.

EXAMPLE 12

A film adhesive was obtained by following the procedure of Example 10 except that ATUBMI was used in an amount of 10 g. The obtained film adhesive was 25 μm thick and had a softening point of 195° C. and so high flexibility that it didn't crack even when bent by 180°.

When this film adhesive was perfectly cured by heating at 200° C. for one hour, the obtained cured film had a glass transition point of 220° C. and an elongation of 16%.

By using said film adhesive, there was obtained a flexible substrate for printed wiring boards by following the process of Example 9 (except that the pressing time was one hour). The 90° copper foil peel strength of this substrate was 1.1 kgf/cm at room temperature and 1.0 kgf/cm at 200° C. (both measured at a pulling rate of 50 mm/min). Also, when this substrate was dipped in a solder bath of 300° C. for 60 seconds, the substrate remained safe from blistering and peeling.

EXAMPLE 13

100 g of the polyimide powder obtained in Example 1 and 50 g of ATUBMI were added in a mixed solvent consisting of 300 g of toluene and 100 g of DMF, and to this solution was added 3 g of 2,5-dimethyl-2,5-di(t-butylperoxy)hexine-3 to form a resin composition (varnish). This resin composition was cast onto a glass plate, dried at 80° C. for 10 minutes and then peeled off to obtain a film. This film was set on an iron frame and dried well by further heating at 150° C. for 30 minutes to obtain an uncured film adhesive. This film adhesive had a thickness of 25 μm and a softening point of 175° C. and didn't crack even when bent by 180°, indicating excellent flexibility of this film adhesive.

When this film adhesive was perfectly cured by heating at 200° C. for one hour, the resulting cured film had a glass transition point of 215° C. and an elongation of 10.4%.

By using said film adhesive, there was produced a flexible substrate for printed wiring boards according to the process of Example 9 (the pressing time being one hour). The 90° copper foil peel strength of this substrate was 1.2 kgf/cm at room temperature and 1.1 kgf/cm at 200° C. (measured at the pulling rate of 50 mm/min in each case). When this substrate was dipped in a 300° C. solder bath for 300 seconds, the substrate showed no sign of blistering and peeling.

EXAMPLE 14

By following the procedure of Example 13 except for non-use of 2,5-dimethyl-2,5-di(t-butylperoxy)hexine-3, there was obtained an uncured film adhesive. This film adhesive had a thickness of 25 μm and a softening point of 175° C. and didn't crack even when bent by 180°, indicating high flexibility of this film adhesive.

When this film adhesive was perfectly cured by heating at 230° C. for 5 hours, the resulting cured film had a glass transition point of 210° C.

By using said film adhesive, there was obtained a flexible substrate for printed wiring boards by following the process of Example 9 (except that the pressing temperature was 230° C. and the pressing time was 5 hours). The 90° copper foil peel strength of this substrate was 1.0 kgf/cm at room temperature (measured at the pulling rate of 50 mm/min). Dipping of this substrate in a solder bath of 300° C. for 60 seconds caused neither blistering nor peeling.

EXAMPLE 15

A film adhesive was obtained by following the procedure of Example 9 except that 30 g of the above-mentioned bismaleimide BMIM was added in place of BBMI. The obtained film adhesive had a thickness of 25 μm and a softening point of 195° C. and remained free of cracks even when bent by 180°, indicating excellent flexibility of this film adhesive.

When this film adhesive was perfectly cured by heating at 200° C. for one hour, the resulting cured film had a glass transition point of 205° C. and an elongation of 9.4%.

By using said film adhesive, there was produced a flexible substrate for printed wiring boards according to the process of Example 9 (with the pressing time shortened to one hour). The 90° copper foil peel strength of this substrate was 0.9 kgf/cm at both room temperature and 200° C. (measured at the pulling rate of 50 mm/min). There took place neither blistering nor peeling when this substrate was dipped in a 300° C. solder bath for 60 second.

EXAMPLE 16

By using 100 g of the polyimide powder obtained in Example 4 and 30 g of BBMI, there was produced a film adhesive according to Example 9. This film adhesive was 25 μm thick, had a softening point of 195° C. and didn't crack even when bent by 180°, indicating excellent flexibility of the film adhesive.

By using said film adhesive, there was manufactured a flexible substrate for printed wiring boards according to the process of Example 9 (the pressing time being one hour). The 90° copper foil peel strength of this substrate was 0.9 kgf/cm at room temperature (measured at the pulling rate of 50 mm/min).

EXAMPLE 17

A film adhesive was obtained in accordance with Example 16 except that the amount of BBMI used was 50 g. The obtained film adhesive was 25 μm thick, had a softening point of 182° C. and remained free of crack even when bent by 180°, indicating excellent flexibility of this film adhesive.

By using said film adhesive, there was produced a flexible substrate for printed wiring boards according to Example 9 (the pressing time was however one hour). The 90° copper foil peel strength of the obtained substrate was 1.0 kgf/cm at room temperature (measured at the pulling rate of 50 mm/min).

EXAMPLE 18

100 g of the polyimide powder obtained in Example 5 and 50 g of N,N'-(diphenylmethane)bismaleimide were dissolved in a mixed solvent consisting of 200 g of toluene and 200 g of DMF, and to this solution was added 3 g of 2,5-dimethyl-2,5-di(t-butylperoxy)hexine-3 to form a resin composition (varnish). This resin composition was impregnated in a 100 μm thick piece of glass cloth and dried by first heating at 80° C. for 30 minutes and then further heating at 150° C. for another 30 minutes to obtain a prepreg.

5 sheets of said prepreg were placed in layers, sandwiched between a pair of 35 μm thick copper foils roughened on one side and then pressed under a pressing force of 50 kg/cm² at 230° C. for one hour to obtain a copper-clad laminate. The 90° copper foil peel strength of this laminate was 0.9 kgf/cm at room temperature (measured at the pulling rate of 50 mm/min). 60 second dipping of this substrate in a 300° C. solder bath caused neither blistering nor peeling. The glass transition point of this laminate, measured after separating the copper foils, was 245° C.

Comparative Example 5

In a four-necked flask equipped with a stirrer, a thermometer, a nitrogen gas inlet tube and a calcium filled tube, were Placed 2.16 g (5.0 mmol) of m-APPS, 0.61 g (5.0 mmol) metatolylenediamine and 24.0 g of DMF to form a solution. Then 3.22 g (10.0 mmol) of BTDA was added in several parts to the solution under ice cooling, and then the mixture was stirred for 5 hours with cooling the mixture to keep the temperature at or below 5° C., to give a polyamide acid varnish. To the varnish were added 2.55 g of acetic anhydride and 1.98 g of pyridine, and the mixture was stirred at room temperature for 3 hours to give a polyimide varnish. The varnish was poured into water to precipitate the polyimide, which was separated, crushed and dried to give a polyimide powder.

This polyimide powder was subjected to determination of reduced viscosity and a solubility test according to Example 1. The results showed that the obtained polyimide powder had a reduced viscosity of 0.72 dl/g and was soluble in DMF but insoluble in dioxane, THF, diethylene glycol dimethyl ether, ethylene glycol dimethyl ether and toluene.

100 g of said polyimide powder and 10 g of BMI were dissolved in 400 g of DMF to prepare a resin composition (varnish), and this resin composition was cast onto a glass plate, dried at 100° C. for 10 minutes and then peeled off to obtain a film. This film was set on an iron frame and dried well by heating at 150° C. for 30 minutes and then at 180° C. for another 30 minutes to obtain an uncured film adhesive. This film adhesive had a softening point of 230° C. and didn't crack even when bent by 180°, indicating high flexibility of this film adhesive.

Said film adhesive was sandwiched between a pair of 35 μm thick copper foils, each of which was roughened on one side, and then pressed under the conditions of 30 kg/cm², 200° C. and one hour, but the copper foils could not be bonded.

A film adhesive was produced in the same way as described above but by dissolving 3 g of 2,5-dimethyl-2,5-di(t-butylperoxy)hexine-3 in the resin composition, and this film adhesive was sandwiched between a pair of 35 μm thick one-side-roughened copper foils and pressed under the same conditions as in the above case (30 kg/cm², 200° C. and one hour) but bonding could not be effected in this case, too.

As described above, the polyimides comprising the repeating units of the formula (I) or the repeating units of the formulae (I) and (II) are low in softening point and soluble in the organic solvents having small polarity. Such polyimides can be easily produced according to the process of this invention.

Also, the thermosetting resin compositions provided according to this invention can be cured at a low temperature and have other excellent properties, particularly in respect of adhesiveness and heat resistance.

What is claimed is:

1. A polyimide comprising 10 to 90 mole % of repeating units of the formula:

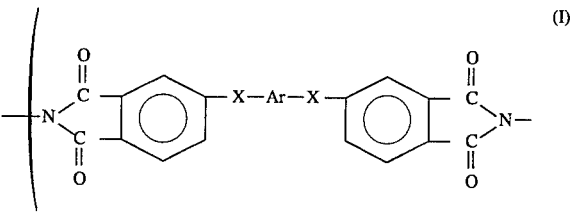

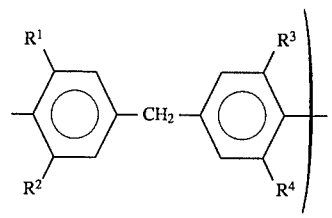

wherein Ar is a divalent group represented by the following formula (a) or (b):

(a):

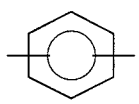

wherein hydrogen atoms in each benzene ring is unsubstituted or is substituted with one or more alkyl groups having 1 to 3 carbon atoms or alkoxy groups having 1 to 2 carbon atoms, two or more of these substituents being the same or different, or (b):

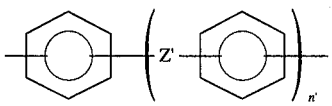

wherein Z' is

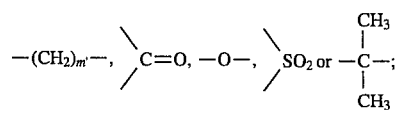

n' and m' are each an integer of 1 or greater; and hydrogen atoms in each benzene ring is unsubstituted or is substituted with one or more alkyl groups having 1 to 3 carbon atoms or alkoxy groups having 1 to 2 carbon atoms, two or more of these substituents being the same or different; X is

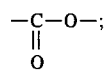

and $R^1$, $R^2$, $R^3$ and $R^4$ represent independently an alkyl or alkoxy group having 1 to 4 carbon atoms, and 90 to 10 mole % of repeating units of the formula;

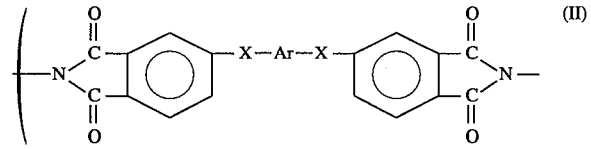

(II)

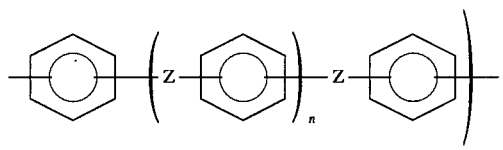

wherein Z is

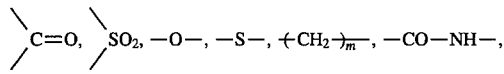

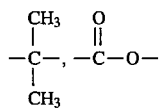

or a direct linkage, and a plurality of linkages represented by Z may be the same or different; m is an integer of 2 or more; n is an integer of 1 to 4; and hydrogens in each benzene ring is unsubstituted or is substituted with one or more alkyl groups, alkoxy groups or halogen atoms; said polyimide having a softening point of 275° C. or lower and being soluble when subjected to a solubility test using at least one organic solvent selected from the group consisting of diethylene glycol dimetyl ether, ethylene glycol dimethyl ether and toluene in a concentration of polyimide of 5% by weight based on the total weight of the solvent and polyimide at room temperature.

2. A process for preparing a polyimide which comprises reacting an acid dianhydride represented by the formula:

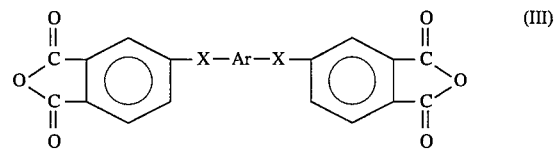

(III)

wherein Ar is a divalent group represented by the following formula (a) or (b):

(a):

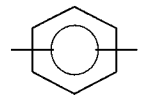

wherein hydrogen atoms in each benzene ring is unsubstituted or is substituted with one or more alkyl groups having 1 to 3 carbon atoms or alkoxy groups having 1 to 2 carbon atoms, two or more of these substituents being the same or different, or (b):

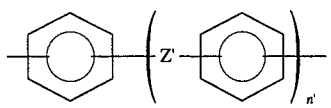

wherein Z' is

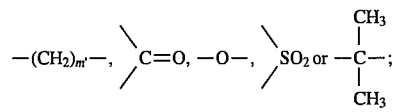

n' and m' are each an integer of 1 or greater; and hydrogen atoms in each benzene ring is unsubstituted or is substituted with one or more alkyl groups having 1 to 3 carbon atoms or alkoxy groups having 1 to 2 carbon atoms, two or more of these substituents being the same or different; and X is

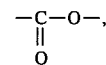

with 10 to 90 mole % of a compound represented by the formula:

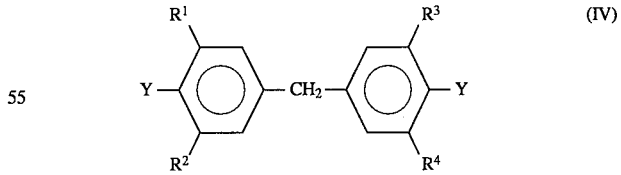

(IV)

wherein Y is an amino group or an isocyanate group; and $R^1$, $R^2$, $R^3$ and $R^4$ represent independently an alkyl or alkoxyl group having 1 to 4 carbon atoms; and 90 to 10 mole % of a compound represented by the formula:

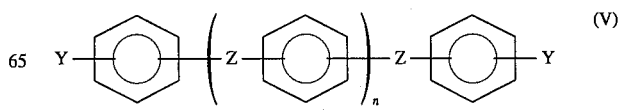

(V)

wherein Z is

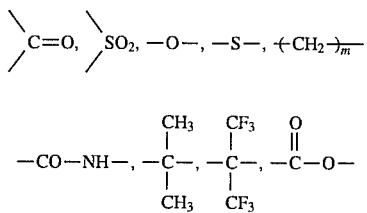

or a direct linkage, and a plurality of linkages represented by Z may be the same or different; y is an amino group or an isocyanate group in formula (IV) and (V); m is an integer of 1 or more; n is an integer of 1 to 4; and hydrogens in each benzene ring is unsubstituted or is substituted with one or more alkyl groups, alkoxy groups or halogen atoms, as a reaction counterpart of the acid dianhydride of the acid dianhydride of the formula (III); said polyimide having a softening point of 275° C. or lower and being soluble when subjected to a solubility test using at least one organic solvent selected from the group consisting of diethylene glycol dimethyl ether, ethylene glycol dimetyl ether and toluene in a concentration of polyimide of 5% by weight based on the total weight of the solvent and polyimide at room temperature.

3. A thermosetting resin composition comprising
(A) a polyimide comprising 10 to 90 mole % of repeating units of the formula:

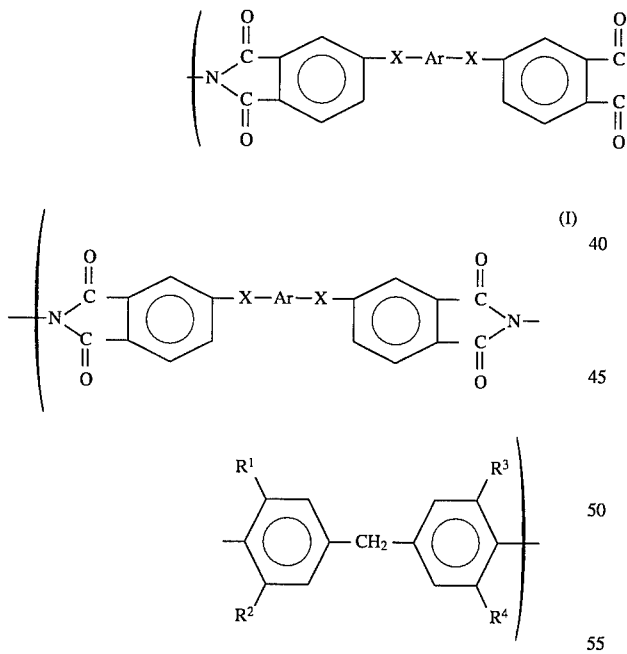

(I)

wherein Ar is a divalent group represented by the following formula (a) or (b):

(a):

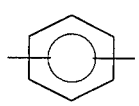

wherein hydrogen atoms in each benzene ring is unsubstituted or is substituted with one or more alkyl groups having 1 to 3 carbon atoms or alkoxy groups having 1 to 2 carbon atoms, two or more of these substituents being the same or different, or (b):

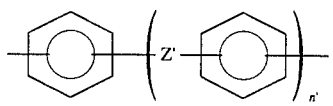

wherein Z' is

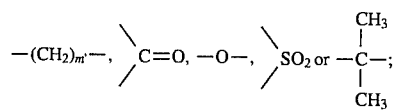

n' and m' are each an integer of 1 or greater; and hydrogen atoms in each benzene ring is unsubstituted or is substituted with one or more alkyl groups having 1 to 3 carbon atoms or alkoxy groups having 1 to 2 carbon atoms, two or more of these substituents being the same or different; X is

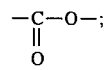

and $R^1$, $R^2$, $R^3$ and $R^4$ represent independently an alkyl or alkoxy group having 1 to 4 carbon atoms, and 90 to 10 mole % of repeating units of the formula:

(II)

wherein Z is

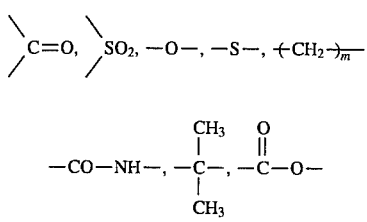

or a direct linkage, and a plurality of linkages represented by Z may be the same or different; m is an integer of or more; n is an integer of 1 to 4; and hydrogens in each benzene ring is unsubstituted or is substituted with one or more alkyl groups, alkoxy groups or halogen atoms and (B) a polymaleimide of the formula:

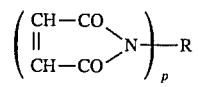

wherein R is a group having valency of 2 or more, and p is an integer of 2 or greater; said polyimide having a softening point of 275° C. or lower and being soluble when subjected to a solubility test using at least one organic solvent selected from the group consisting of diethylene glycol dimethyl ether, ethylene glycol dimethyl ether and toluene in a concentration of polyimide of 5% by weight based on the total weight of the solvent and polyimide at room temperature.

4. A film obtained from the thermosetting resin composition of claim 3.

5. A thermosetting resin composition according to claim 3, which further comprises (C) a radical polymerization initiator.

6. A film obtained from the thermosetting resin composition of claim 5.

7. A polyimide comprising 10 to 90 mole % of repeating units of the formula:

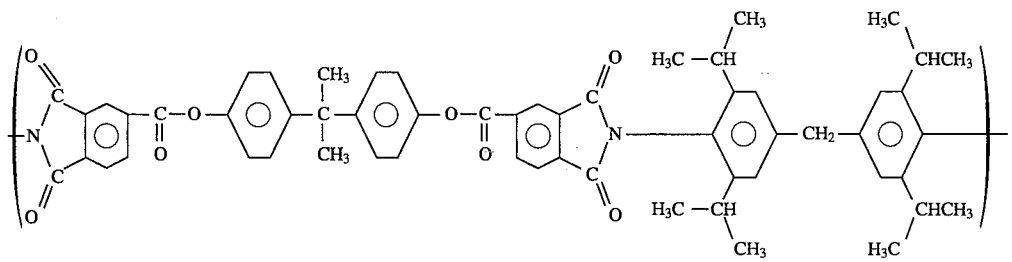

and 90 to 10 mole % of repeating units of the formula:

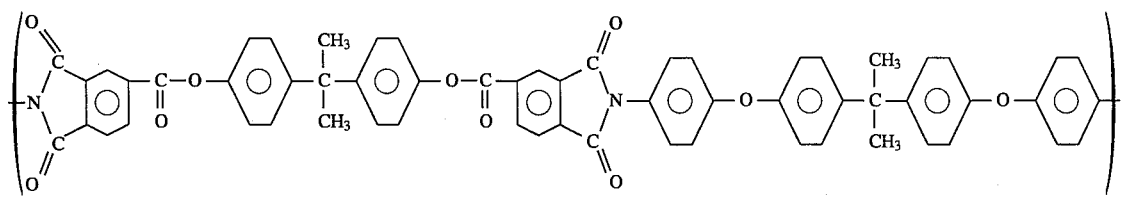

said polyimide having a softening point of 275° C. or lower and being soluble when subjected to a solubility using at least one organic solvent selected from the group consisting of diethylene glycol dimetyl ether, ethylene glycol dimethyl ether and toluene in a concentration of polyimide of 5% by weight based on the total weight of the solvent and polyimide at room temperature.

* * * * *